US012748920B2

(12) United States Patent
Shillingford et al.

(10) Patent No.: US 12,748,920 B2
(45) Date of Patent: Sep. 29, 2026

(54) RULES-BASED TEMPLATE EXTRACTION

(71) Applicant: DeepSee.ai Inc., Salt Lake City, UT (US)

(72) Inventors: Stephen W. Shillingford, Salt Lake City, UT (US); Wacey T. Richards, Midway, UT (US); Bryan W. Sparks, Lindon, UT (US)

(73) Assignee: DeepSee.ai Inc., Draper, UT (US)

( * ) Notice: Subject to any disclaimer, the term of this patent is extended or adjusted under 35 U.S.C. 154(b) by 827 days.

(21) Appl. No.: 17/364,698

(22) Filed: Jun. 30, 2021

(65) Prior Publication Data

US 2021/0406772 A1 Dec. 30, 2021

Related U.S. Application Data

(60) Provisional application No. 63/046,614, filed on Jun. 30, 2020.

(51) Int. Cl.
*G06F 40/279* (2020.01)
*G06F 18/214* (2023.01)
(Continued)

(52) U.S. Cl.
CPC .......... *G06F 40/279* (2020.01); *G06F 18/214* (2023.01); *G06F 40/169* (2020.01); (Continued)

(58) Field of Classification Search
CPC .... G06F 40/279; G06F 18/214; G06F 40/169; G06F 40/30; G06F 40/216; G06N 5/025; G06N 20/00; G06V 30/1448; G06V 30/1456; G06V 30/19133; G06V 30/19173; G06V 30/41
See application file for complete search history.

(56) References Cited

U.S. PATENT DOCUMENTS 9,235,812 B2 1/2016 Scholtes
9,430,194 B1 * 8/2016 Childs ........................ G06F 8/33
(Continued)

OTHER PUBLICATIONS

Xavier, Daniela, et al. "A rule-based expert system for inferring functional annotation." Applied soft computing 35 (2015): 373-385 (Year: 2015).*

*Primary Examiner* — Michael C. Lee
(74) *Attorney, Agent, or Firm* — PCFB, LLC; Justin K. Flanagan

(57) ABSTRACT

A user may markup the training documents to identify salient terms in a set of training unstructured documents. The system may automatically generate an extraction ruleset for each salient term that can be manually modified or edited by the user. The user may also provide analysis rulesets for each of the salient terms using, for example, a no-code graphical user interface. A machine learning model can be trained to automatically extract and analyze the salient terms based on feature vectors built from the extraction rulesets and/or analysis rulesets of the salient terms. After training, the system may import a set of unstructured documents for term extraction and analysis by the trained machine learning model. The system may generate a report, such as a PDF or an interactive graphical user interface, summarizing the results of the extracted and analyzed salient terms.

13 Claims, 18 Drawing Sheets

(51) Int. Cl.

| | |
|---|---|
| ***G06F 40/169*** | (2020.01) |
| ***G06F 40/30*** | (2020.01) |
| ***G06N 5/025*** | (2023.01) |
| ***G06N 20/00*** | (2019.01) |
| ***G06V 30/14*** | (2022.01) |
| ***G06V 30/19*** | (2022.01) |
| ***G06V 30/41*** | (2022.01) |

(52) U.S. Cl.

CPC ............. *G06F 40/30* (2020.01); *G06N 5/025* (2013.01); *G06N 20/00* (2019.01); *G06V 30/1448* (2022.01); *G06V 30/1456* (2022.01); *G06V 30/19133* (2022.01); *G06V 30/19173* (2022.01); *G06V 30/41* (2022.01)

(56) References Cited

U.S. PATENT DOCUMENTS

| | | | | |
|---|---|---|---|---|
| 10,162,850 | B1 | 12/2018 | Jain | |
| 10,229,117 | B2 | 3/2019 | Cormack | |
| 10,489,439 | B2 | 11/2019 | Calapodescu | |
| 10,534,825 | B2 | 1/2020 | Mukherjee et al. | |
| 10,614,345 | B1 | 4/2020 | Tecuci | |
| 10,657,368 | B1 | 5/2020 | Edmund | |
| 10,705,796 | B1 * | 7/2020 | Doyle | G06F 16/282 |
| 10,726,374 | B1 | 7/2020 | Engineer | |
| 10,733,192 | B1 * | 8/2020 | Hegde | G06F 16/24575 |
| 10,755,045 | B2 | 8/2020 | Crouse | |
| 10,810,709 | B1 | 10/2020 | Tiyyagura | |
| 10,848,494 | B2 | 11/2020 | Shelton | |
| 10,860,849 | B2 | 12/2020 | Liu | |
| 10,877,924 | B2 | 12/2020 | Wang | |
| 10,936,974 | B2 | 3/2021 | Chaudhari | |
| 2008/0162141 | A1 * | 7/2008 | Lortz | H04M 1/72412 704/270.1 |
| 2009/0119095 | A1 * | 5/2009 | Beggelman | G06F 40/30 704/9 |
| 2013/0250339 | A1 * | 9/2013 | Ming | H04N 1/0005 358/1.14 |
| 2015/0169593 | A1 | 6/2015 | Bogdanova | |
| 2017/0372408 | A1 * | 12/2017 | Khandelwal | G06Q 30/0641 |
| 2018/0011838 | A1 * | 1/2018 | Beller | G06F 16/3329 |
| 2018/0260735 | A1 * | 9/2018 | Arad | G06N 20/00 |
| 2019/0005012 | A1 * | 1/2019 | Priestas | G06N 20/00 |
| 2019/0005421 | A1 * | 1/2019 | Hammel | G06Q 10/06393 |
| 2019/0124101 | A1 | 4/2019 | Cobb | |
| 2019/0138580 | A1 | 5/2019 | Taleghani | |
| 2019/0243841 | A1 * | 8/2019 | Hoffmann | G06F 40/186 |
| 2019/0362257 | A1 * | 11/2019 | Luo | G06N 20/00 |
| 2020/0133964 | A1 * | 4/2020 | Lee | G06F 16/355 |
| 2020/0184109 | A1 * | 6/2020 | Gerard | H04L 63/08 |
| 2020/0372596 | A1 * | 11/2020 | Cheung | G06Q 40/03 |
| 2020/0402133 | A1 * | 12/2020 | Buzzell | G06Q 30/0631 |
| 2021/0065053 | A1 * | 3/2021 | Higgins | G06F 9/542 |
| 2021/0342742 | A1 * | 11/2021 | G Rao | G06N 20/00 |
| 2022/0222242 | A1 * | 7/2022 | Spranger | G06N 3/0464 |

* cited by examiner

RULES-BASED TEMPLATE EXTRACTION

RELATED APPLICATIONS

This application claims the benefit of and priority to U.S. Provisional Patent Application No. 63/046,614 filed on Jun. 30, 2020, titled "Systems and Methods for Predictive Analysis Reporting," which application is hereby incorporated by reference in its entirety.

TECHNICAL FIELD

This application generally relates to systems and methods for the analysis of documents, including through the use of trained machine learning models for term extraction and analysis.

BRIEF DESCRIPTION OF THE DRAWINGS

The written disclosure herein describes illustrative embodiments that are nonlimiting and non-exhaustive. This disclosure references certain of such illustrative embodiments depicted in the figures described below.

DETAILED DESCRIPTION

Figure 1A:
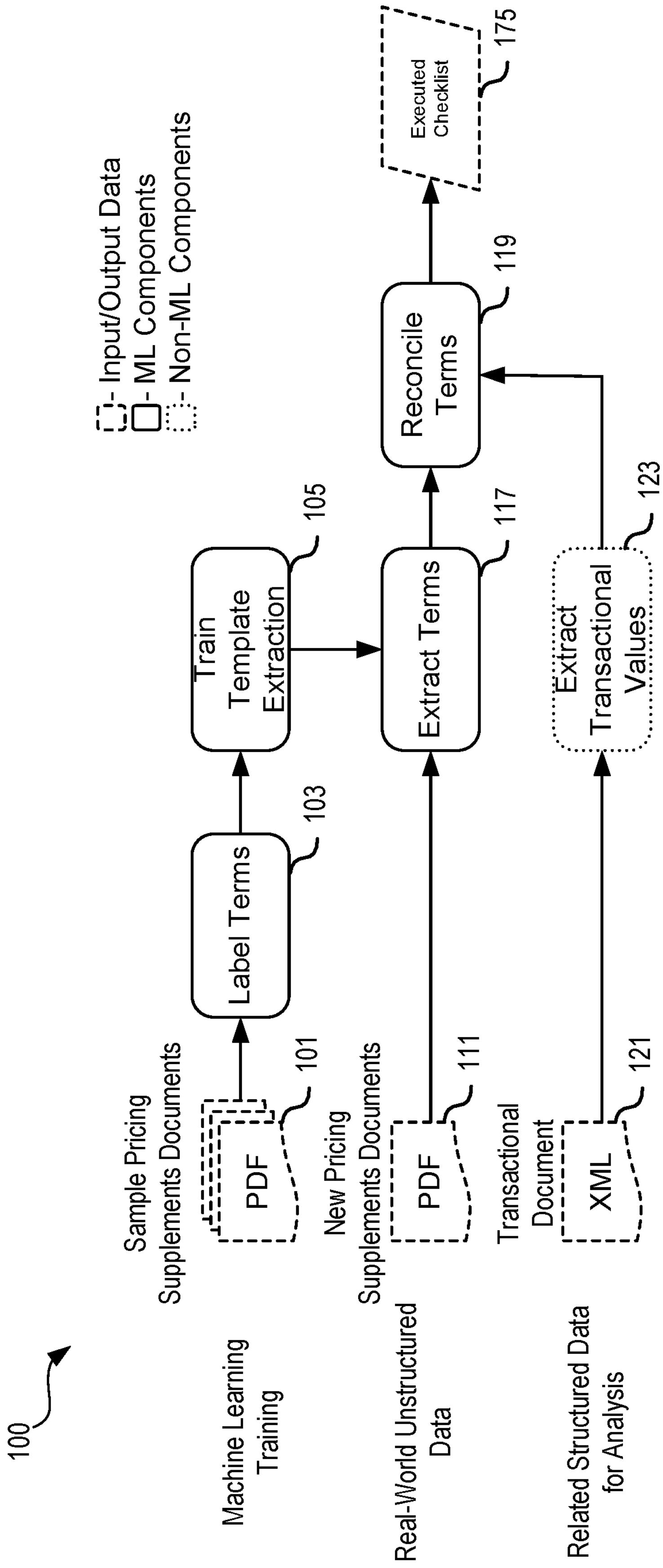
FIG. 1A illustrates a flow diagram of an example machine learning pipeline, according to one embodiment.

The presently described systems and methods automate data extraction and facilitate pipeline processing for analysis, comparison, and/or insight generation. Traditional systems and methods that leverage artificial intelligence (AI) and machine learning (ML) require custom programming and individualized machine learning model training. The presently described systems and methods provide a general-purpose artificial intelligence platform (referred to as a "customizable AI platform" that leverages an "informed machine learning" approach). The informed machine learning approach facilitates the customization of application-specific machine learning model-based artificial intelligence extraction and analysis pipelines. A machine learning model may be trained to automatically extract and analyze salient terms identified by a user. The machine learning model may be trained using feature vectors that are "built" (e.g., limited, bounded, or otherwise modified) from an extraction ruleset and/or analysis ruleset associated with each respective salient term. The machine learning model may be trained using hyperparameters that are tuned (e.g., adjustment of the weights and/or biases) using the extraction ruleset and/or analysis ruleset.

A wide variety of document classification, term extraction, and term analysis systems have been developed and used in recent years. Machine learning algorithms have become increasingly utilized for automatic term extraction from unstructured data (e.g., documents, files, etc.) and/or automated analysis thereof. The features may include or be described as independent variables, input variables, or the like. Training datasets may be used to train machine learning algorithms, including supervised and unsupervised machine learning algorithms.

For example, a machine learning algorithm may be trained to identify, extract, classify, compare, and/or analyze terms in unstructured documents. Once trained, the machine learning algorithm may be used to implement the same functionality on a wide variety of diverse unstructured documents. A wide variety of machine learning approaches exist and can be used for term extraction including, without limitation, machine learning approaches that utilize algorithms such as nearest neighbor, naive Bayes, decision trees, linear regression, support vector machines, neural networks, and the like. Machine learning algorithms may be unsupervised, supervised, semi-supervised, or utilize reinforcement learning.

Many traditional machine learning algorithms are suitable when the quantity of training data is sufficiently high and the quality of the training data is sufficiently diverse. A well-known problem of overfitting occurs when existing machine learning models are trained using datasets that are sparse or insufficiently diverse. Proposed solutions to overfitting generally include using higher quality or more training data. However, in some instances additional or more diverse training datasets may not be available. The presently described embodiments address overfitting caused by sparse or non-diverse training data sets by leveraging the knowledge (e.g., "tribal knowledge") of human subject matter experts. The term "expert" is used loosely to describe any user that is somewhat knowledgeable about the subject matter for which the machine learning algorithm is being trained.

The knowledge collected from the subject matter expert is used to develop or build the feature vectors used when training the machine learning model. The feature vectors may be adapted, bounded, guided, or otherwise modified from traditional machine learning feature vectors based on the knowledge provided by the subject matter expert. In various embodiments, as described herein, the knowledge is collected from the subject matter expert and presented for review and modification through graphical user interfaces. In many instances, the graphical user interfaces provide a "no-code" approach that allows the subject matter expert, or another knowledgeable user, to define and/or refine automatically generated extraction rulesets and/or analysis rulesets for extracting and/or analyzing salient terms without using a computer programming language. In some embodiments, the graphical user interface may allow the user to view the extraction rulesets and/or analysis rulesets in plain language, pseudo-code, actual code, and/or as normalized feature vectors.

The presently described systems and methods provide an improved machine learning approach that, as noted above, can be described as an informed machine learning algorithm. In various embodiments, a system presents a graphical user interface through which a subject matter expert (or another knowledgeable user) can markup or otherwise annotate unstructured training documents. The subject matter expert can, for example, identify salient terms within the unstructured documents. The salient terms may be named, classified, and otherwise identified by the subject matter expert via the graphical user interface.

The user may markup or otherwise annotate the structured training documents using, for example, a touch screen interface, a keyboard, a mouse, a pointer, or the like. In some embodiments, the system may include natural language processing capabilities to receive markups, annotations, salient term identification, and/or ruleset definitions or refinements via voice input (e.g., via a microphone). In some instances, the graphical user interface may include various graphical annotation tools for highlighting, underlining, coloring, circling, strikethrough, outlining, etc. salient terms.

The subject matter expert may not be a data scientist capable of generating computer program code. Conversely, programmers and data scientists may not have the subject matter expertise to identify salient terms within unstructured documents. The presently described systems and methods provide a technological solution to overfitting problems of machine learning algorithms trained with sparse and/or non-diverse datasets. Moreover, in some embodiments, the technological solution can be utilized by subject matter experts and other users with subject matter knowledge without the need to understand and utilize data scientist programming languages and code.

The system utilizes the markup provided by the subject matter expert or another knowledgeable user to generate an extraction ruleset for each identified salient term. For instance, the system may generate an estimated extraction ruleset that the subject matter expert can review and revise. The estimated extraction ruleset may, for example, include rules for contextual extraction of the salient term, explicit match rules, semantic match or semantic correlation rules, and the like. For example, the system may generate contextual extraction rules for a salient term named "Contract Date" based on the subject matter expert's markup of several training contracts.

As a simplified example, the contextual extraction rule may specify that the Contract Data salient term can be extracted from an unstructured document classified as a "Contract" when the date is found in the first paragraph of the contract and in close proximity to specific phrases (e.g., "effective as of"). Similarly, the system may generate explicit and semantic rules for various formatting of dates (e.g., numbers, letters, month first, year first, day first, etc.). The system may extract the terms "as-is" or may normalize the terms to facilitate subsequent reporting and comparing.

In some embodiments, the system may present a term list of the salient terms and associated extraction rulesets to the subject matter expert or another knowledgeable user. The subject matter expert or another knowledgeable user may refine or edit the extraction rulesets to ensure that the associated feature vectors generated by the system will reduce or eliminate overfitting. Using the simplified example above, the system may generate a contextual rule for the "Contract Date" a salient term that specifies that the "Contract Date" is found in the first paragraph. This may be a reasonable contextual rule based on the markups provided by the subject matter expert to the (relatively sparse and/or non-diverse) training dataset. A traditional machine learning model might have developed feature vectors corresponding to the same contextual rule.

However, the subject matter expert may review and refine the automatically generated contextual rule based on their subject matter knowledge or expertise. For instance, the subject matter expert may add or refine the contextual rule to specify that the term is located in the first paragraph or in the first paragraph following a set of paragraphs or clauses that begin with the word "wherein." While the relatively sparse and/or non-diverse training dataset may not have included any such examples, the subject matter expert may know from experience that the contextual rule should be less restrictive.

The machine learning model may be trained using feature vectors that are built to conform to the extraction ruleset. Accordingly, the knowledge provided by the subject matter expert results in a more flexible or dynamic feature vector. The machine learning model trained using the "adjusted" feature vector is more flexible, dynamic, and adaptable to datasets that deviate from the training dataset. The machine learning model is referred to as an informed machine learning model because the machine learning model is informed by the subject matter expert with information that may not have been available via any analysis of the training dataset. The informed machine learning model is informed by the subject matter expert before training. Like other machine learning models, post-training feedback loops (automatic and user-involved) may be used to refine or improve the machine learning model. However, the informed machine learning model reduces or eliminates overfitting due to low quality or low quantity training datasets in the first instance.

The presently described embodiments allow for a customizable AI platform for term extraction and analysis. In some embodiments, the customizable AI platform may itself include a graphical user interface. Any number of customers may utilize the customizable AI platform, and each customer may create a uniquely customized pipeline of term labeling, document classification, and machine learning model(s) for term extraction and analysis.

In various embodiments, the customizable AI platform allows customers to generate uniquely customized machine learning model-based artificial intelligence extraction and analysis pipeline systems (referred to as "trained AI systems") to evaluate data through automation and extensible integration. The machine learning models of a trained AI system can be trained to apply natural language processing models to unstructured data to extract, classify, and tag information. For example, machine learning models can be trained to extract data from documents for post-trade reconciliation for financial products, insurance premium mispricing, clause precision in legal instruments, and other purposes.

In some examples, a trained AI system may process structured and/or unstructured documents to extract and/or parse terms from otherwise unstructured data. The extracted terms may be labeled, tagged, annotated, or otherwise categorized for subsequent processing and analysis. In various embodiments, the automatic labeling of extracted terms may be used to create a JavaScript Object Notation-formatted (JSON-formatted) document.

The presently described systems and methods provide a graphical user interface for a user to define salient terms, rules for document layout analysis, rules for extracting salient terms from unstructured data, and/or rules for normalizing extracted salient terms. The user may also use the graphical user interface to define conditional logic and build rules for actions to be taken in response to the analysis of the extracted salient terms. The graphical user interface may provide a template manager to facilitate the creation of customized templates that instruct the trained AI system with respect to the rules for normalization, rules for analysis, and conditional logic for responsive actions.

In one embodiment, the system includes a computer, a server, a network, a data storage device, a non-transitory computer-readable medium, and/or instructions stored on the non-transitory computer-readable medium to implement any combination of the operations, steps, methods, functions, and implementations described herein. For example, instructions stored on a non-transitory computer-readable medium may be executed by a processor to cause a computer system to import training documents from a data storage device (e.g., a local hard drive or a network-connected remote storage device). The system may present a graphical user interface that displays the training documents (e.g., one at a time or multiple at a time) and allows the user to navigate and markup the training documents. The training documents may be, for example, unstructured training documents.

The system may generate a term list of salient terms, extraction rulesets, and/or analysis rulesets as the user navigates and markups the unstructured training documents. As described above, extraction rulesets may include context or contextual matching rules, explicit matching rules, semantic matching rules, and/or the like that identify expected formatting variances, relative locations of terms, identifiable text, or images expected to be proximate a salient term, formatting styles, etc. Analysis rulesets may include, for example, comparison rules and reconciliation rules that facilitate comparison of salient terms between different documents, identified acceptable levels of deviation, facilitate normalization of terms expected to be provided in different formats or data object types (e.g., strings, Booleans, integers, float, etc.) and the process for verification or validation thereof. In some instances, the analysis rulesets may specify different documents and sources (unstructured and structured) that should be used to verify or validate each respective salient term with exact, explicit, or semantic matches. In no-code approaches, the user may define or refine automatically generated comparison rules using, for example, comparison symbols such as greater than symbols (>), less than symbols (<), equal symbols (=), and/or other mathematical operators or values.

The system may generate a "template" of the salient terms along with their associated extraction rulesets and/or analysis rulesets. The template or term list may be displayed via a graphical user interface that allows the user (e.g., a subject matter expert or another knowledgeable user) to navigate and review each of the identified salient terms, extraction rulesets, and/or analysis rulesets. The user may revise, refine, and/or add additional extraction rulesets and/or analysis rulesets. Once the user has verified or approved the template of salient terms and the associated extraction rulesets and/or analysis rulesets, the system may use the "template" to automatically build feature vectors that are bounded, restricted, modified to conform to, or otherwise based on the extraction and/or analysis rulesets.

The system may then train an informed machine learning model to automatically extract and/or analyze the salient terms based on the feature vectors built from the extraction ruleset and/or analysis ruleset. In some embodiments, a single machine learning model may be trained to perform term extraction and term analysis. In other embodiments, multiple machine learning models may be trained to implement specific tasks or functions that collectively operate to provide a machine learning model for term extraction and analysis. In some embodiments, a machine learning model may be trained for term extraction and the extracted terms may be analyzed using a separate system, which may or may not utilize a separate machine learning model.

Once the machine learning model is trained, the system may import other unstructured documents for term extraction and analysis via the trained machine learning model. The system may generate a report (e.g., a PDF, a printout, or a report-specific graphical user interface) of the results of the term extraction and analysis. The graphical user interface for informing and training a machine learning model is a central element of a document processing pipeline. However, as described herein, the system may utilize a more robust pipeline that includes various feedback loops, reconciliation training modules, mathematical calculation modules, data pre-processing modules, labeling of training documents (manual or automated), layout analysis modules, and/or the like to analyze, compare, review, and/or reconcile salient terms within one or more documents (structured and unstructured).

Some of the infrastructure that can be used with embodiments disclosed herein is already available, such as general-purpose computers, computer programming tools and techniques, digital storage media, virtual computers, virtual networking devices, and communications networks. A computer may include a processor, such as a microprocessor, microcontroller, logic circuitry, or the like. The processor may include a special purpose processing device, such as an ASIC, PAL, PLA, PLD, Field Programmable Gate Array, or another customized or programmable device. The computer may also include a computer-readable storage device, such as non-volatile memory, static RAM, dynamic RAM, ROM, CD-ROM, disk, tape, magnetic, optical, flash memory, or another computer-readable storage medium.

Aspects of certain embodiments described herein may be implemented as software modules or components. As used herein, a software module or component may include any type of computer instruction or computer-executable code located within or on a computer-readable storage medium. A software module may, for instance, comprise one or more physical or logical blocks of computer instructions, which may be organized as a routine, program, object, component, data structure, etc., that perform one or more tasks or implement particular abstract data types.

A particular software module may comprise disparate instructions stored in different locations of a computer-readable storage medium, which together implement the described functionality of the module. Indeed, a module may comprise a single instruction or many instructions and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments. In other instances, well-known structures, materials, or operations are not shown or described in detail to avoid obscuring aspects of this disclosure. In addition, the steps of a method do not necessarily need to be executed in any specific order, or even sequentially, nor need the steps be executed only once, unless otherwise specified.

FIG. 1A illustrates a flow diagram of an example machine learning pipeline 100, according to one embodiment. As illustrated, the flow diagram includes a machine learning training process, a real-world unstructured data process for term extraction, and a related structured data process for the reconciliation of claim terms between the structured data and the unstructured data. Sample documents 101 are input into the system for training a template 105 for term extraction. For example, the template may include a list of terms (e.g., a term list) that were labeled, at 103, or otherwise identified as salient by a user (e.g., a subject matter expert). The term list may include each of the salient terms and any associated extraction rules.

Terms within the sample documents may be labeled, at 103, (e.g., by human tagging or by manual rule creation). The tagged or labeled documents 101 are used to train one or more machine learning models to accurately identify the terms in the sample documents. For example, the machine learning model may be trained using the sample documents 101 with feature vectors and/or hyperparameters that are built from or tuned in conformance with the template (the salient terms and associated extraction rulesets).

The trained machine learning models may be used to extract terms, at 117, from real-world unstructured documents 111. As illustrated, real-world unstructured documents 111 may be input into the system. The trained machine learning models extract, at 117, the terms from the unstructured documents 111 for subsequent reconciliation, at 119. The terms extracted, at 117, from the unstructured documents 111 may be compared with terms extracted from other unstructured documents (not shown). Alternatively, or additionally, the terms extracted, at 117, from the unstructured documents 111 may be compared (e.g., reconciled) with terms or transactional values 123 extracted from the structured transactional documents 121.

The system may generate a report or checklist 175 of the results of the analysis or reconciliation, at 119, of the extracted terms. For example, the system may generate a PDF report or interactive graphical user interface with a checklist of terms that identifies actions to be taken based on matches or differences between the terms extracted, at 117, from the unstructured documents 111 and the extracted transactional values 123 from the structured transactional documents 121.

Figure 1B:
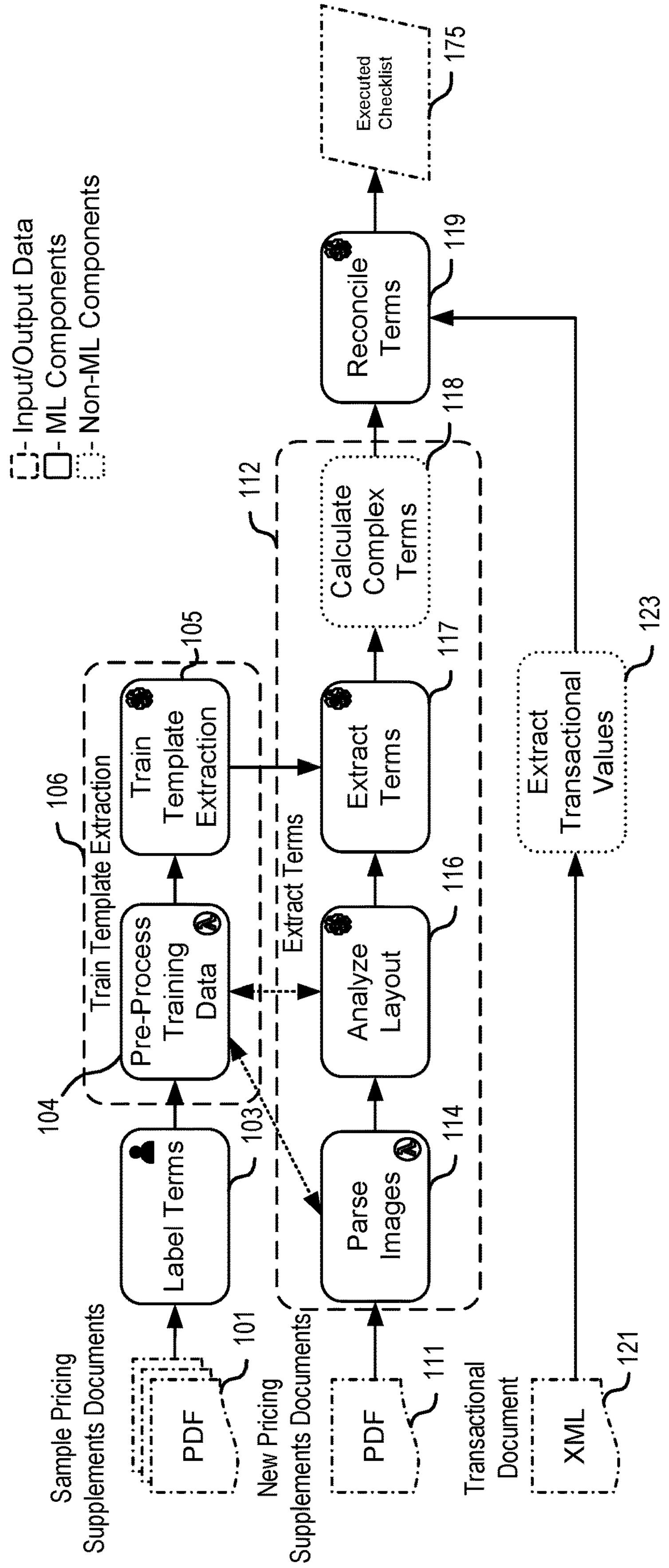
FIG. 1B illustrates the flow diagram of FIG. 1A with an expanded view of the process for the machine learning template extraction training, according to one embodiment.

FIG. 1B illustrates the flow diagram of FIG. 1A with an expanded view of the process for the machine learning template extraction training, at 106, and subsequent term extraction, at 112, according to one embodiment. As illustrated, training a template for term extraction, at 106, may include a pre-processing 104 of the training data. Preprocessing 104 of the training data may include parsing images, at 114, and/or analysis of the layout, at 116.

After the machine learning model is trained, the machine learning model may be used to extract terms from the unstructured documents 111. Term extraction, at 112, may include image parsing, at 114, layout analysis, at 116, term extraction, at 117, and mathematical or other complex calculations, at 118.

In some embodiments, the term extraction process 112 may be implemented in discrete steps or phases (as illustrated in FIG. 1B). In other embodiments, the term extraction process 112 may be abstracted as part of a machine learning model trained and informed by the subject matter expert information. The machine learning model may, for example, be trained using feature vectors that are built from an extraction ruleset and/or analysis ruleset associated with each respective salient term (e.g., as part of the template 105).

Figure 1C:
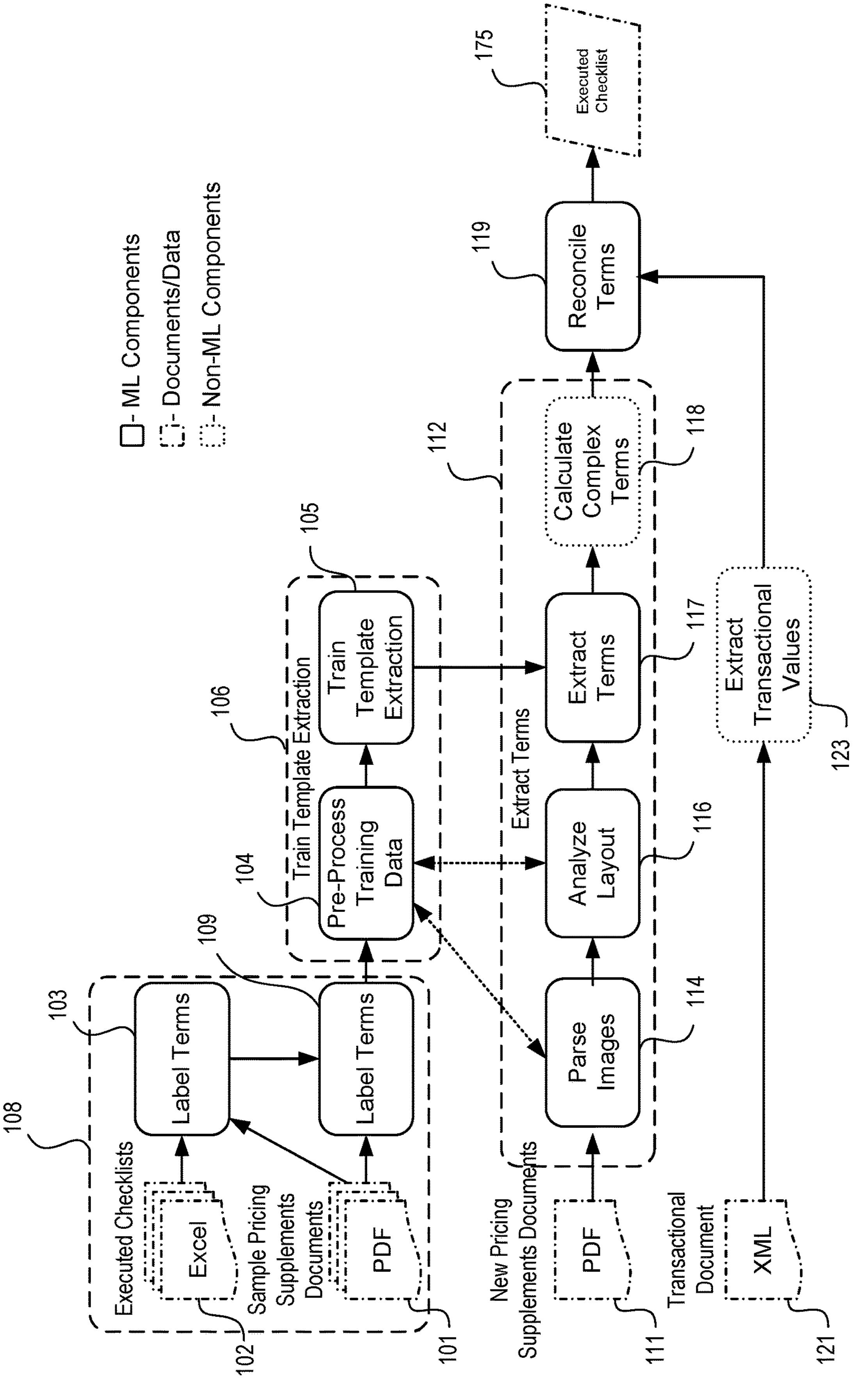
FIG. 1C illustrates the flow diagram of FIG. 1B with additional subsystems for automatic term labeling, according to one embodiment.

FIG. 1C illustrates the flow diagram of FIG. 1B with additional subsystems for automatic term labeling, at 108, according to one embodiment. As illustrated, an Excel document (or another structured document, such as a CSV, XML, HTML, or another file) 102 containing terms may be used to automatically label terms, at 103 and 109, in the sample documents 101. The labeled sampled documents 101 may then be used for training the machine learning models for the template(s) 105 for term extraction 112. In some embodiments, a machine learning model may be used to label terms in structured or unstructured documents that are trained using the information provided by a subject matter expert.

A single machine learning algorithm may be used as a part of an artificial intelligence system that implements term labeling, term extraction, and/or term analysis and comparison. In other embodiments, the artificial intelligence system may include multiple discrete machine learning models that are separately trained to perform discrete tasks in the extraction and analysis pipeline. For example, a term labeling may be implemented via a first machine learning algorithm, term extraction may be implemented via a second machine learning algorithm, and term comparison, analysis, and/or reconciliation may be implemented by a third machine learning algorithm. One or more of the discrete machine learning algorithms may be an "informed" machine learning algorithm trained using feature vectors and/or hyperparameters provided by a knowledgeable user or subject matter expert.

Figure 1D:
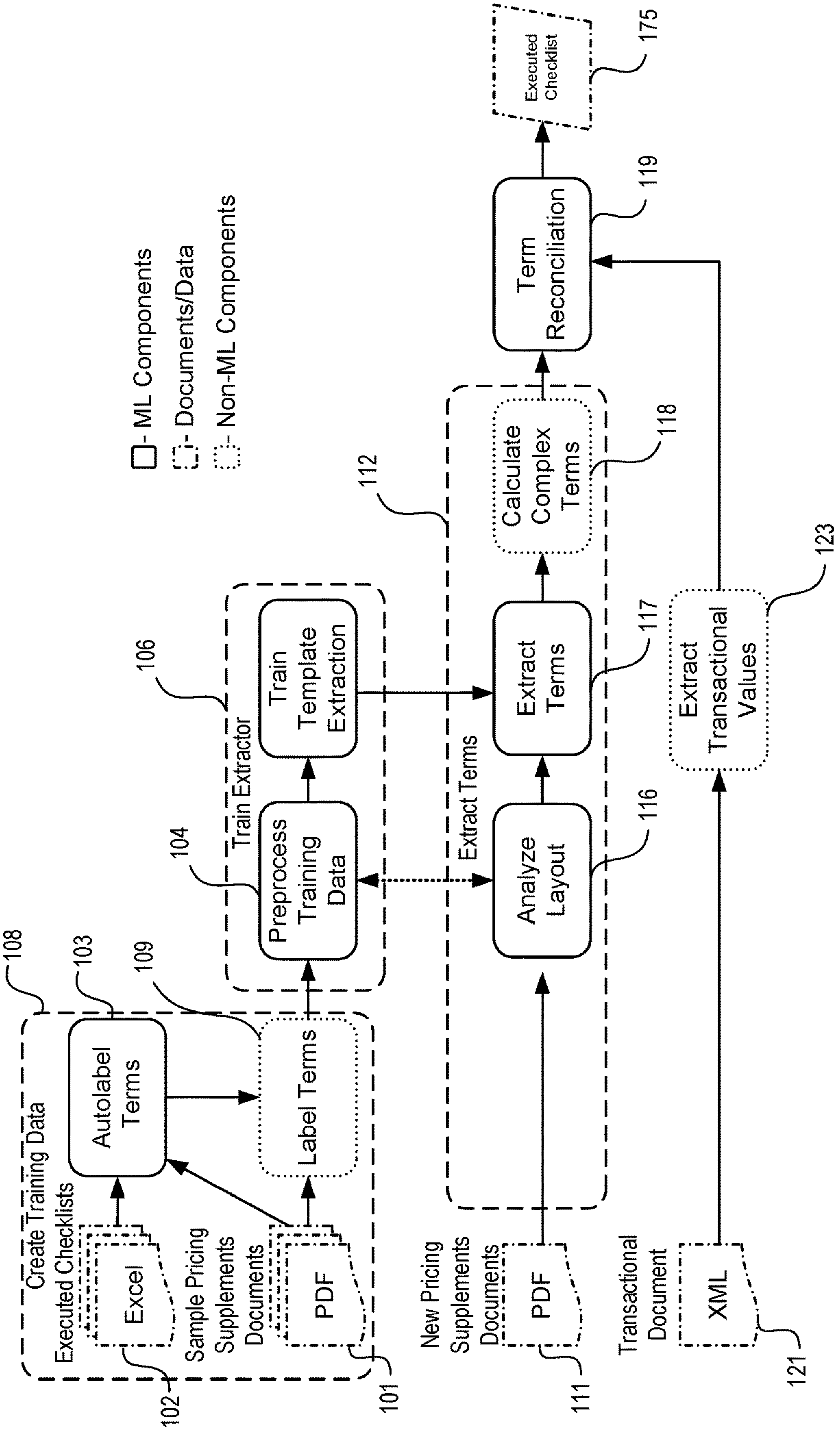
FIG. 1D illustrates the flow diagram of FIG. 1C without explicit image parsing, according to one embodiment.

FIG. 1D illustrates the flow diagram of FIG. 1C without explicit image parsing, according to one embodiment. As illustrated, a structured document 102, such as a CSV or XML document may identify a list of salient terms to be automatically labeled, at 103 and 109, within the sample documents 101. The labeled sample documents 101 may then be used for training the machine learning models for the template(s) 105 for term extraction 112. In the illustrated embodiment, the term extraction process 112 includes a layout analysis, at 116, term extraction, at 117, and mathematical or other complex calculations, at 118.

Again, the term extraction process 112 may be implemented via discrete processes or algorithms. Alternatively, one or more machine learning models may be trained (and, optionally, informed by the subject matter expert information). The machine learning model(s) may be trained using feature vectors that are built from an extraction ruleset and/or analysis ruleset associated with each respective salient term (e.g., as part of the template 105). Additionally, or alternatively, the machine learning model(s) may be trained using hyperparameters that are tuned or adjusted based on the extraction ruleset and/or an analysis ruleset associated with each respective salient term.

Figure 2:
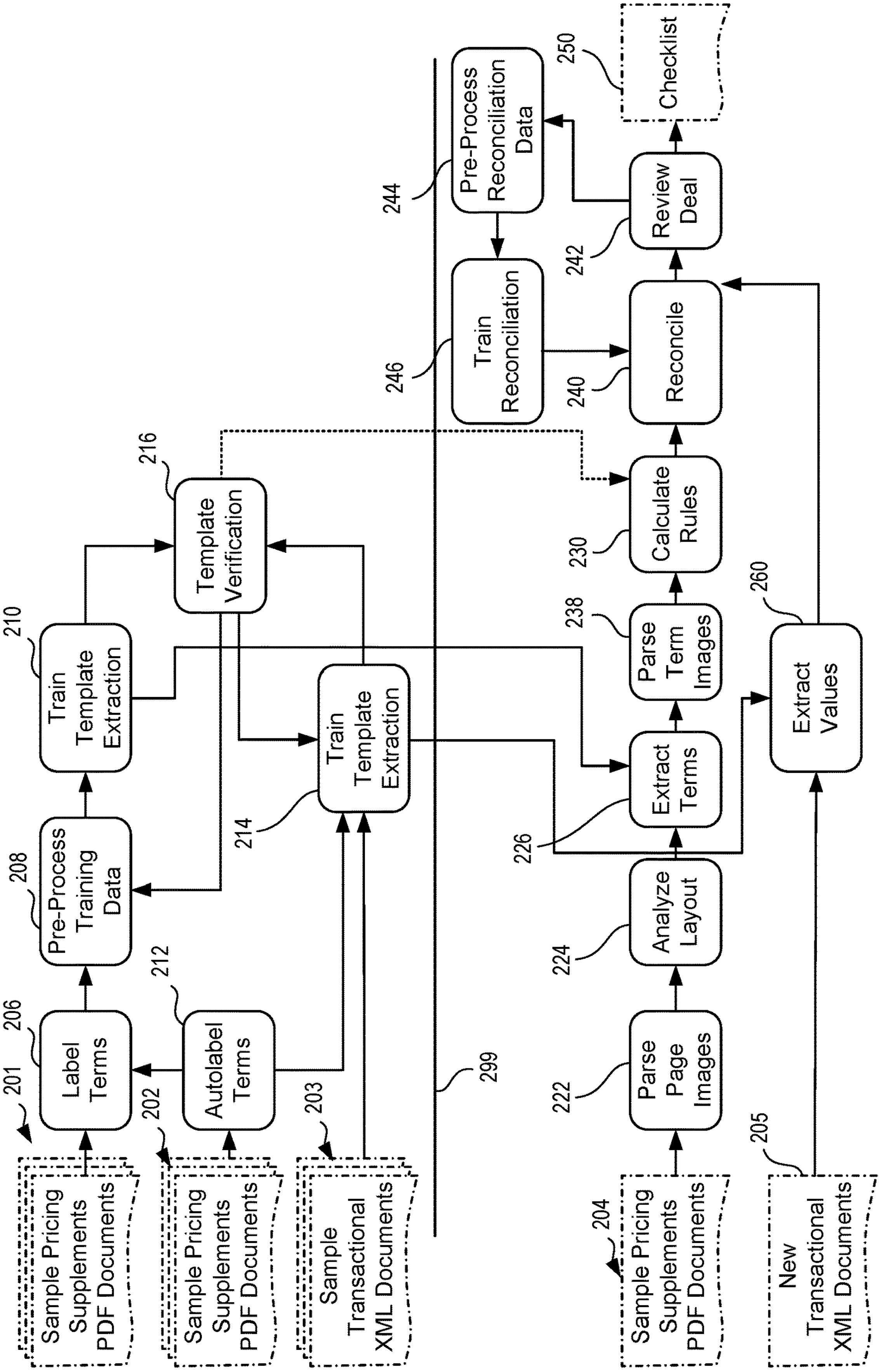
FIG. 2 illustrates another embodiment of a flow diagram of a machine learning pipeline, according to various embodiments.

FIG. 2 illustrates another embodiment of a flow diagram of a machine learning pipeline, according to various embodiments. The system may import or otherwise receive sample unstructured documents 201 and 202 (such as PDFs of pricing supplements, contracts, term sheets, trade records, or the like). The training documents may also include sample structured documents 203, such as XML documents. The terms in the unstructured documents 201 may be manually labeled, at 206, and/or automatically labeled, at 212. In some embodiments, the labeling 206 and 212 may be implemented using a checklist of terms, such as a checklist provided or created by a subject matter expert or included in the sample structured documents 203.

In some embodiments, the data may be preprocessed, at 210. The system may generate a template, at 210 and 214, of salient terms and associated extraction rules for training a machine learning model. The system may present the template (e.g., a term list of salient terms and associated extraction rulesets) via a graphical user interface for a subject matter expert or another user to verify, at 216.

The modules, processes, and functions above the midpoint line 299 are implemented prior to training the extraction machine learning module. As described herein, the extraction machine learning module may be considered an informed machine learning module in that the extraction machine learning module may be trained using the sample unstructured documents 201 and 202 with feature vectors and/or hyperparameters that are built or tuned, respectively, based on the verified template 216 of extracted terms and associated extraction rulesets.

In some embodiments, training the machine learning models 210 using the unstructured sample documents 201 may include pre-processing training data 208 based on feedback from a template verification process 216. Recursive training of the template term extraction module 214 using feedback from a template verification module 216 allows for improved term extraction templates with continued training (e.g., based on feedback from a user). Sample transactional structured documents 203 (e.g., XML documents) may be used to train the template 214 for extracting values from structured documents for subsequent reconciliation.

Below the midpoint line 299, the system uses the trained extraction machine learning model to extract and analyze terms in real-world unstructured documents 204. The system may import unstructured documents 204 for processing using the trained machine learning models. The machine learning module may explicitly or implicitly parse, at 222, and analyze the layout, at 224, of the imported unstructured documents 204. The machine learning model may extract terms, at 226. In some embodiments, the extracted terms may be normalized. For example, extracted terms in image form may be parsed, at 238. The system may "calculate" or otherwise determine, at 230, analysis rulesets associated with the extracted terms (e.g., as defined in the verified template 216).

As illustrated, the terms extracted from the unstructured documents 204 may be reconciled, 240, with values extracted, at 260, from a structured XML data file 205. The reconciliation process 240 may include a review process 242 that may be manually or automatically implemented and include pre-processing of the reconciliation data, at 244, to facilitate a feedback loop for training, at 246, the reconciliation process 240.

For example, the reconciliation feedback loop may utilize trained machine learning models to increasingly improve reconciliation accuracy. The system may generate a report or checklist 250 of the results of the analysis or reconciliation 240 of the extracted terms. For example, the system may generate a PDF report or interactive graphical user interface for user review.

Figure 3A:
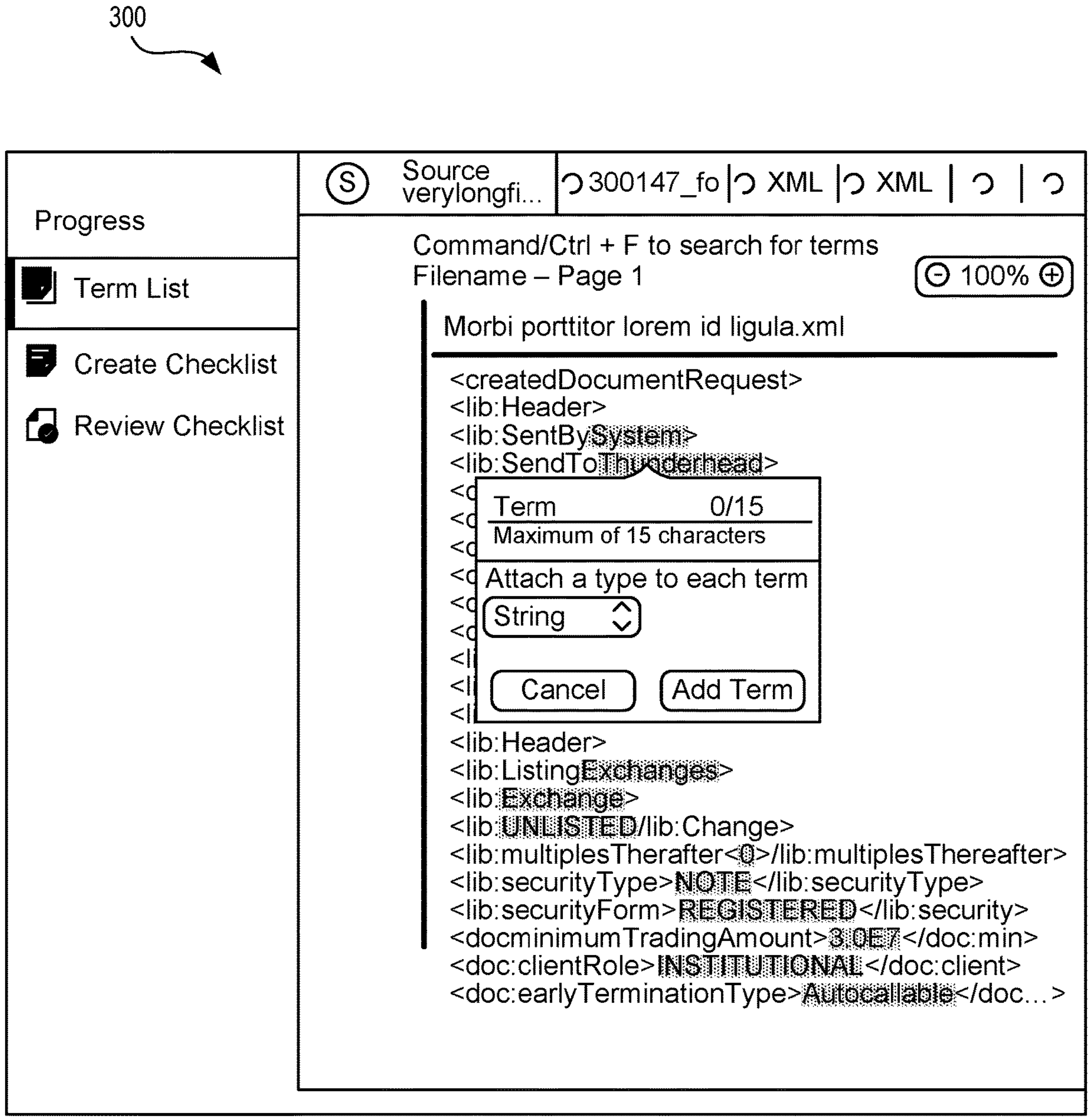
FIG. 3A illustrates an example of a graphical user interface for identifying and naming terms, according to one embodiment.

FIG. 3A illustrates an example of a graphical user interface 300 for a subject matter expert to identify and name terms within an unstructured document. In the illustrated example, HTML markup documents may be used to identify salient terms, give names to the salient terms, identify a data type of each salient term, and/or add the salient term to a checklist or template of salient terms. As described herein, the template or term list may include extraction rulesets and/or analysis rulesets associated with each salient term.

Figure 3B:
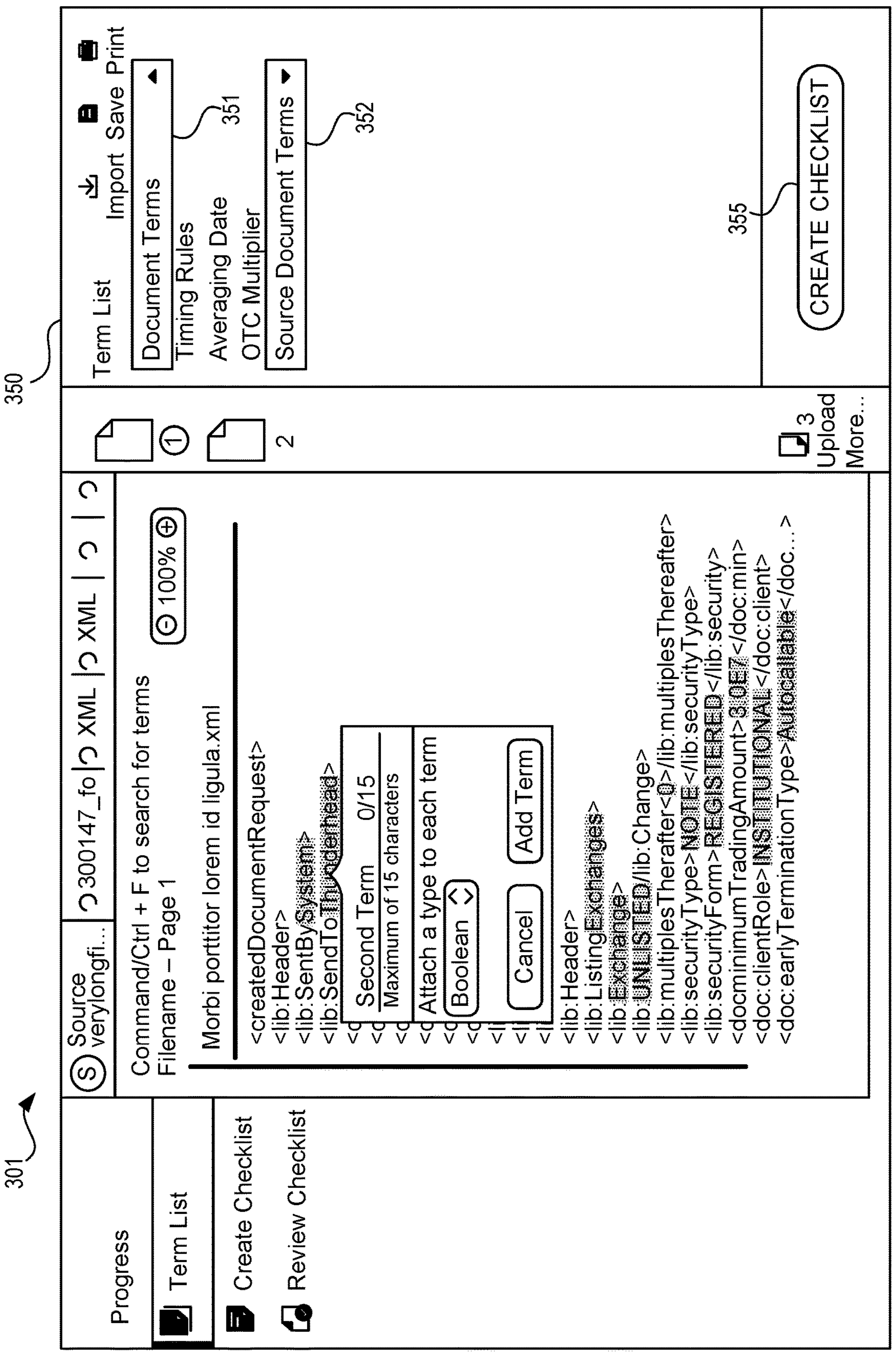
FIG. 3B illustrates an example of a graphical user interface for selecting a data object type for an identified term, according to one embodiment.

FIG. 3B illustrates an example of a graphical user interface 301 for selecting a data object type for an identified term, according to one embodiment. As illustrated, a selected term is identified as the "Second Term" and is associated with a data type "Boolean." A term list 350 displayed on the right side includes a dropdown menu of terms within the document 351 as well as terms within a source document 352 (currently empty). As illustrated, terms within the document 351 may be associated with timing rules, averaging dates, and/or OTC multiplier rules. The user may finalize and create a checklist of salient terms via the graphical user interface, at 355.

Figure 3C:
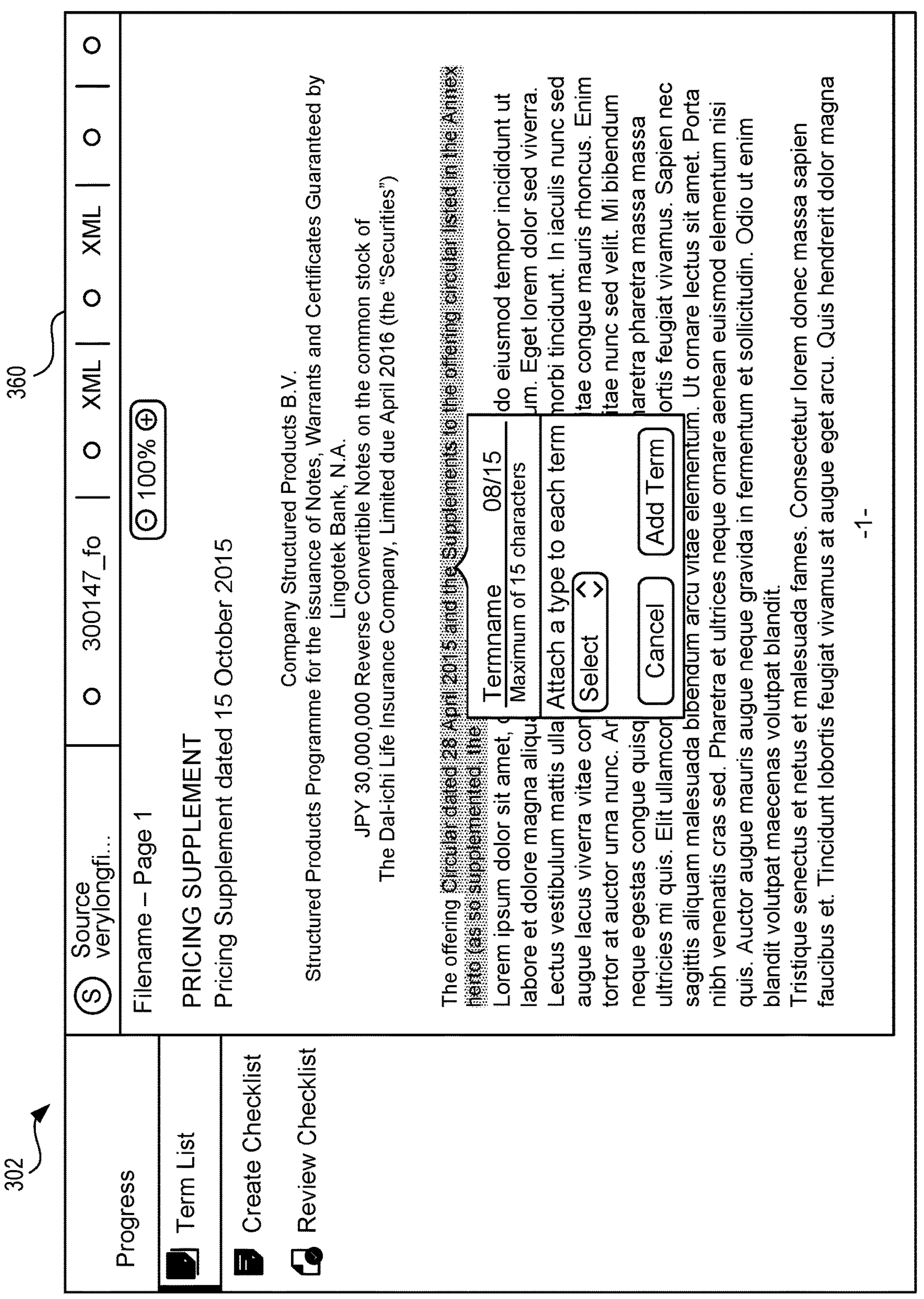
FIG. 3C illustrates an example of a graphical user interface for creating a template for term extraction from an unstructured document, according to one embodiment.

FIG. 3C illustrates an example of a graphical user interface 302 for creating a template for term extraction from an unstructured document, according to one embodiment. As illustrated, the user may highlight a second portion of text and identify a term name for the document, select a data type, and then add the term to a term list associated with the document. A navigation bar 360 of the graphical user interface allows a user to switch between various documents, including structured and unstructured documents.

Figure 3D:
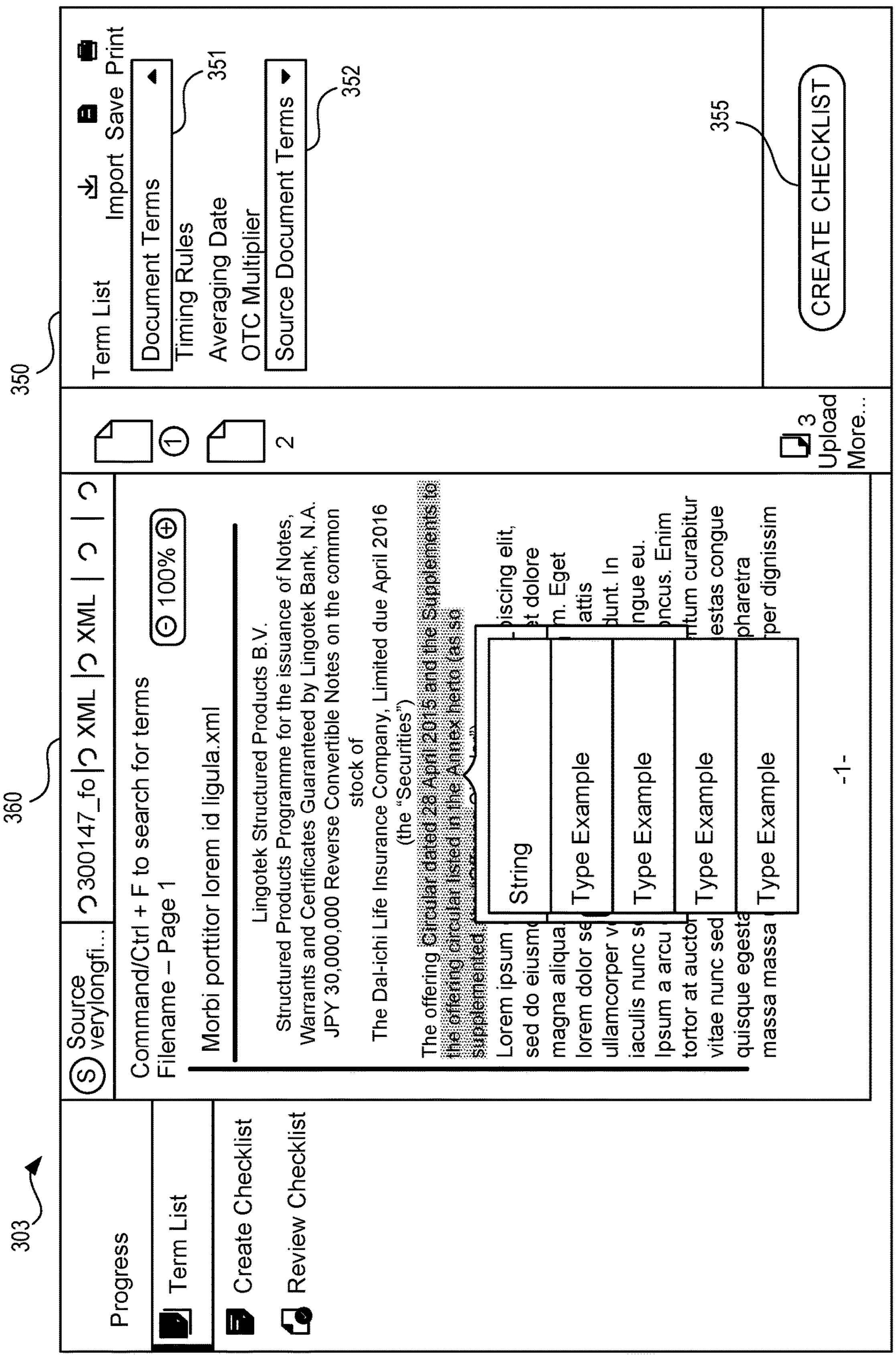
FIG. 3D illustrates an example of the assignment of a data object to a term within a template for term extraction, according to one embodiment.

FIG. 3D illustrates an example graphical user interface 303 of the assignment of a data object to a term within a template for term extraction, according to one embodiment. Any of a wide variety of data types may be created or utilized. In the illustrated example, a string data type is available, as well as several placeholders within a dropdown menu. A navigation bar 360 of the graphical user interface 303 allows a user to switch between various documents, including structured and unstructured documents. A term list 350 displayed on the right side includes a dropdown menu of terms within the document 351 as well as terms within a source document 352 (currently empty). As illustrated, terms within the document 351 may be associated with timing rules, averaging dates, and/or OTC multiplier rules. The user may finalize and create a checklist of salient terms via the graphical user interface, at 355.

Figure 3E:
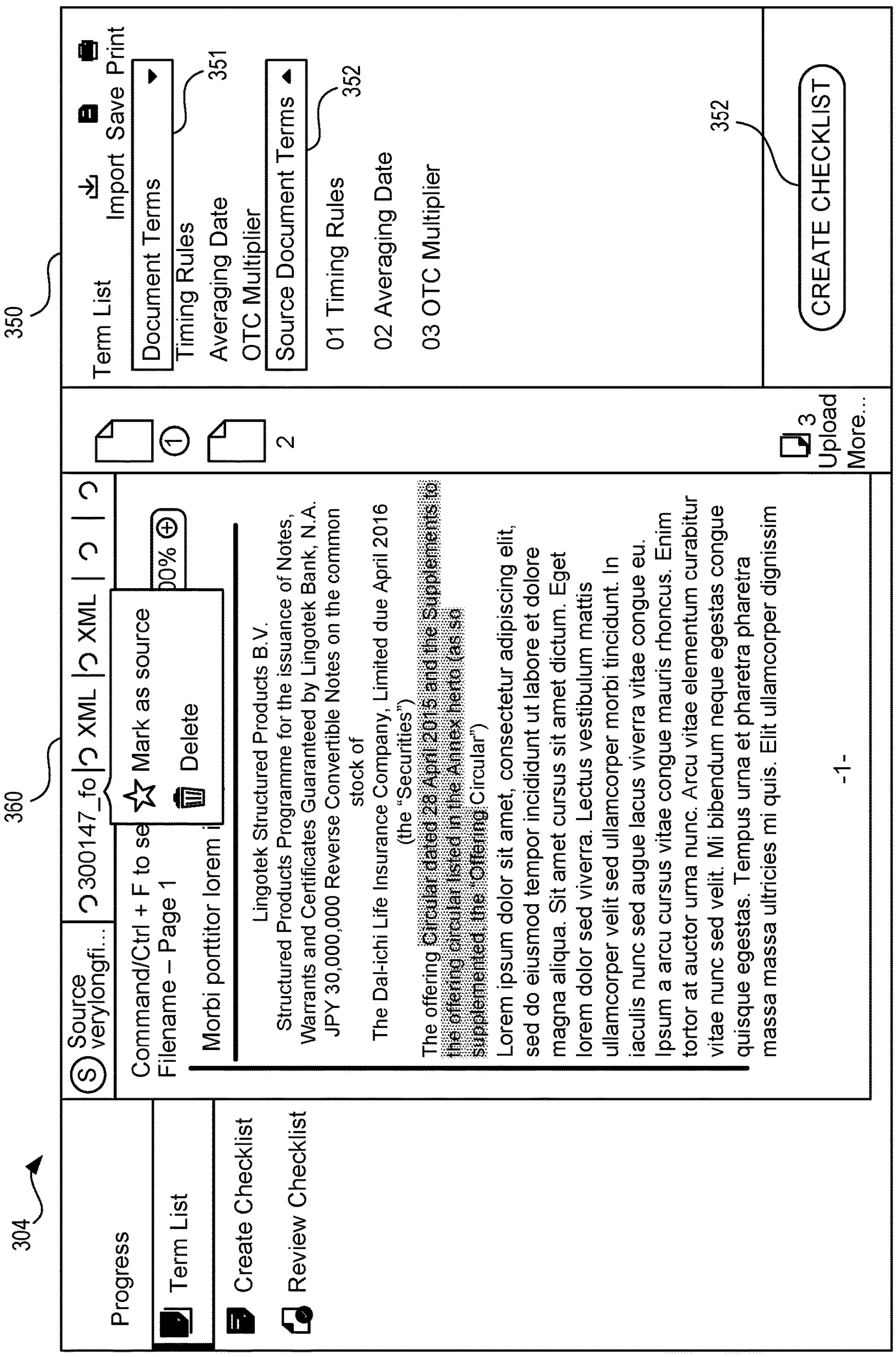
FIG. 3E illustrates an example of a graphical user interface for identifying source documents and documents for template creation, according to one embodiment.

FIG. 3E illustrates an example of a graphical user interface 304 for identifying or assigning specific documents as "source documents" and/or documents for template creation, according to one embodiment. As illustrated on the term list subpanel 350 on the right side of the graphical user interface, a term list may be imported, saved, or printed and include a graphical display with dropdown or expanding graphical user interface icons to allow for document terms to be added to the instant document 351 and/or to a source document 352. As further illustrated, a navigation bar 360 is present for navigating the document tabs at the top of the graphical user interface. The user may delete, add, or otherwise modify documents added to the system.

Figure 3F:
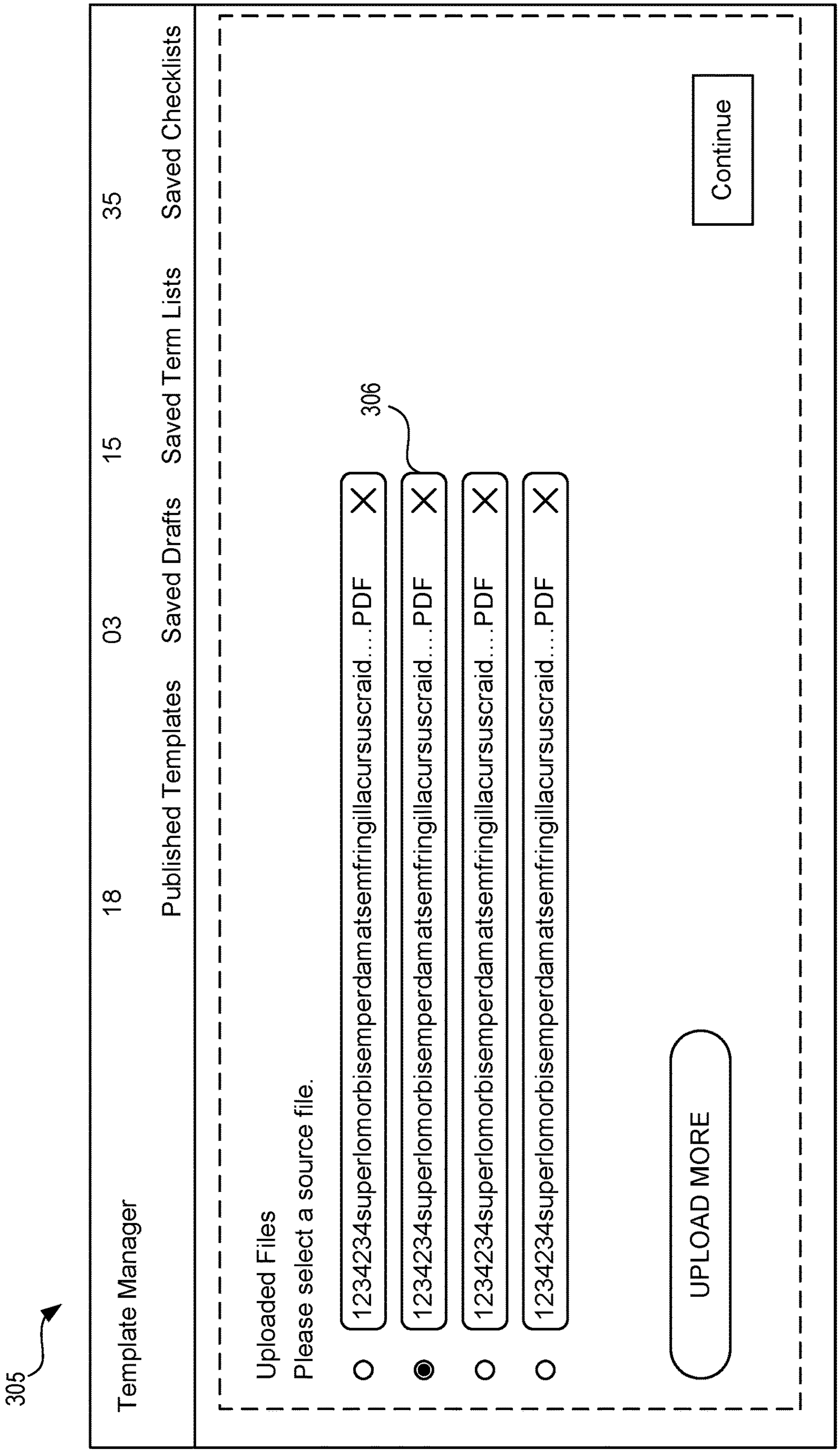
FIG. 3F illustrates an example of a graphical user interface for uploading files as part of a template manager for creating term lists and checklists, as described herein, according to one embodiment.

FIG. 3F illustrates an example of a graphical user interface 305 of a template manager. As illustrated, the template manager user interface 305 may be used to upload files, create new checklists, create or modify existing templates, and/or otherwise modify or revise existing workflows. In the illustrated embodiment, a source file 306 is selected via a radio button.

Figure 4A:
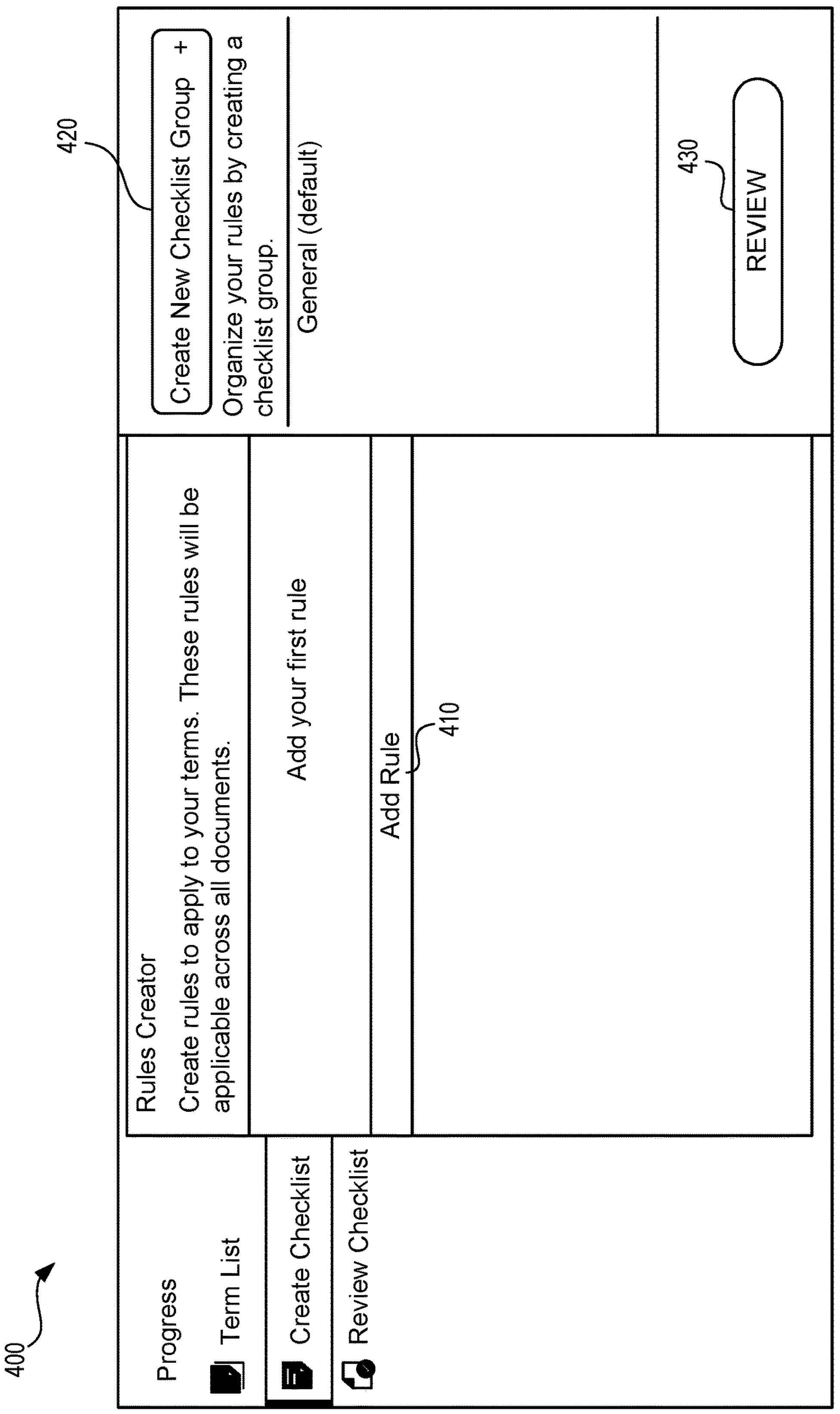
FIG. 4A illustrates an example of a graphical user interface for creating rules as part of a checklist for term extraction and analysis, according to one embodiment.

FIG. 4A illustrates an example of a graphical user interface 400 for creating or adding rules as part of a checklist or template for term extraction and analysis, according to one embodiment. As described herein, a template may contain a term list of salient terms and associated extraction rulesets and/or analysis rulesets. The template can be used to build, adapt, adjust, tune, or otherwise impact the generation of feature vectors and/or hyperparameters used to train an extraction machine learning model, an analysis machine learning model, and/or a combination machine learning model that both extracts and analyzes salient terms from unstructured documents.

As illustrated, the graphical user interface includes elements to add rules 410 and create new checklist groups 420. Once the template is complete with the salient terms and associated rules, the user may review, at 430, the final template prior to training the machine learning model. The rules provided by the user (e.g., a subject matter expert or another knowledgeable user) inform the machine learning model and modify the training thereof to reduce or eliminate overfitting problems associated with training the machine learning model with a sample dataset that is not sufficiently large and/or not sufficiently diverse.

Figure 4B:
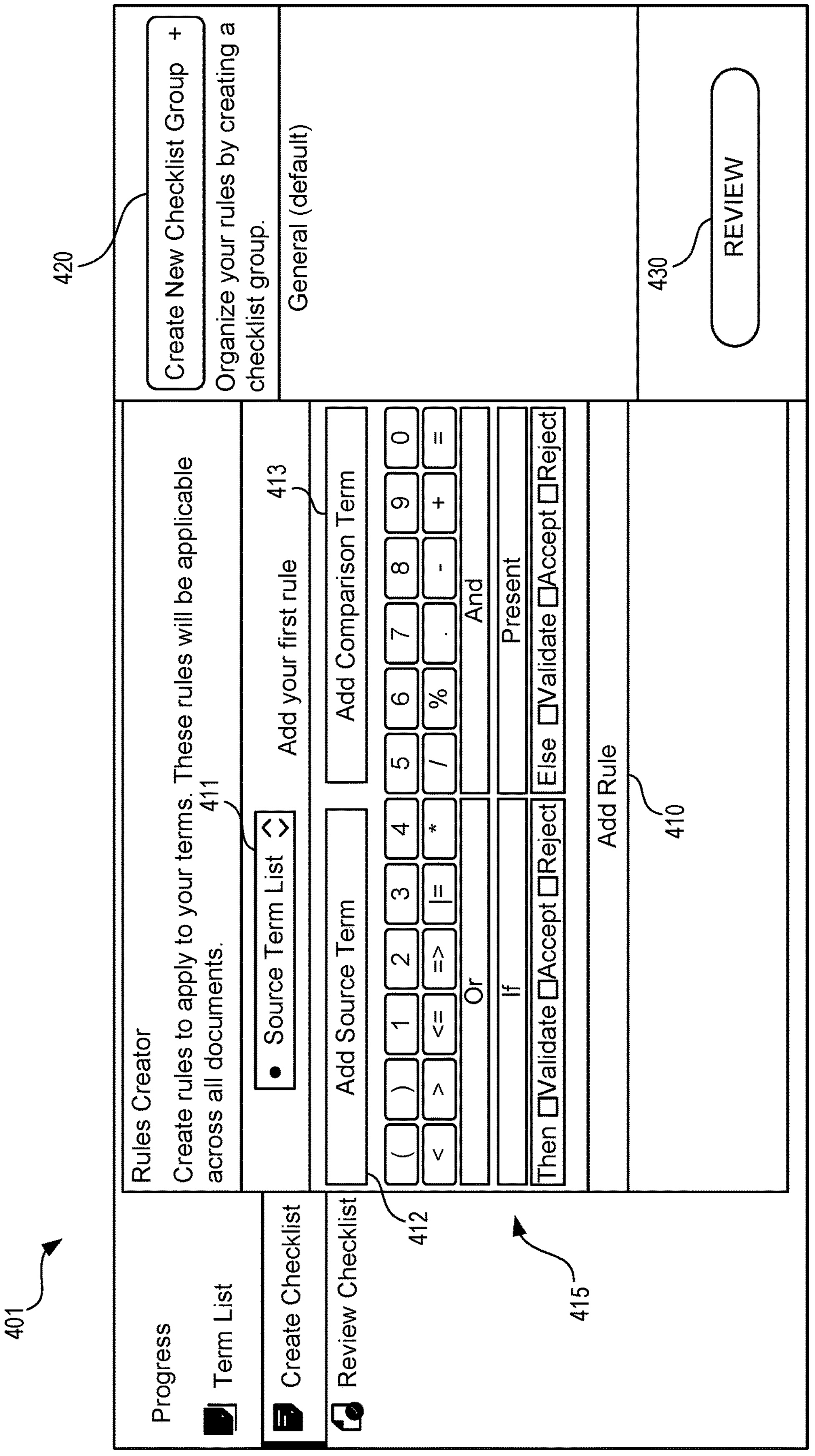
FIG. 4B illustrates additional portions of the graphical user interface for creating rules as part of a checklist for term extraction and analysis, according to one embodiment.

FIG. 4B illustrates a rules creator (or rules revisor) component of the graphical user interface 401 for creating rules as part of a checklist for term extraction and analysis, according to one embodiment. As illustrated, the system includes an intuitive graphical user interface to create rules for identifying, comparing, analyzing, and otherwise handling terms identified in structured and/or unstructured documents. As illustrated, any number of comparison terms may be graphically available. The user may select a source term list 411 and then add source terms 412 and comparison terms 413 (e.g., from another document, such as a structured XML document for validation or reconciliation). Various operators 415 facilitate a no-code creation of rules without the user being required to program explicit comparison rules.

The user may create one rule for each salient term. Additionally, the user may add any number of rules, at 410, for association with one or more salient terms. As previously described, the user may create new checklist groups 420 and review, at 430, the final analysis rulesets before training the machine learning model.

Figure 4C:
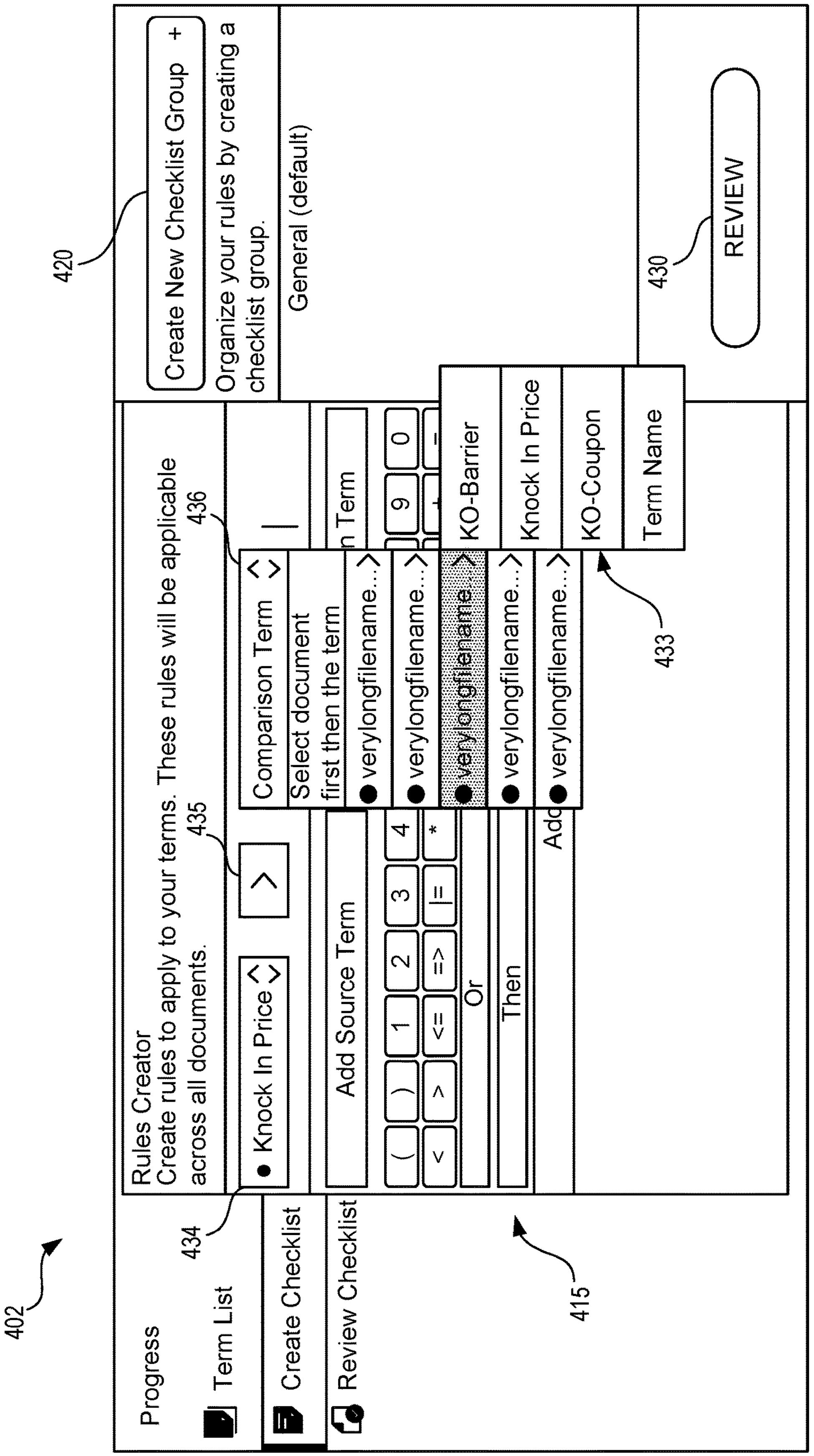
FIG. 4C illustrates portions of the graphical user interface for selecting comparison terms as part of creating the checklist of rules for term extraction and analysis, according to one embodiment.

FIG. 4C illustrates portions of the graphical user interface 402 for selecting comparison terms, at 413, as part of creating the checklist of rules for term extraction and analysis, according to one embodiment. A dropdown menu facilitates the no-code selection of comparison terms from any number of documents uploaded to the system. In the illustrated example, the user has selected a Knock In Price salient term, at 434, from a first document. A greater than operator 435 is selected to compare the Knock In Price salient term 434 from the first document with a selected KO-Coupon salient term 433 in a second document, at 436.

Figure 5A:
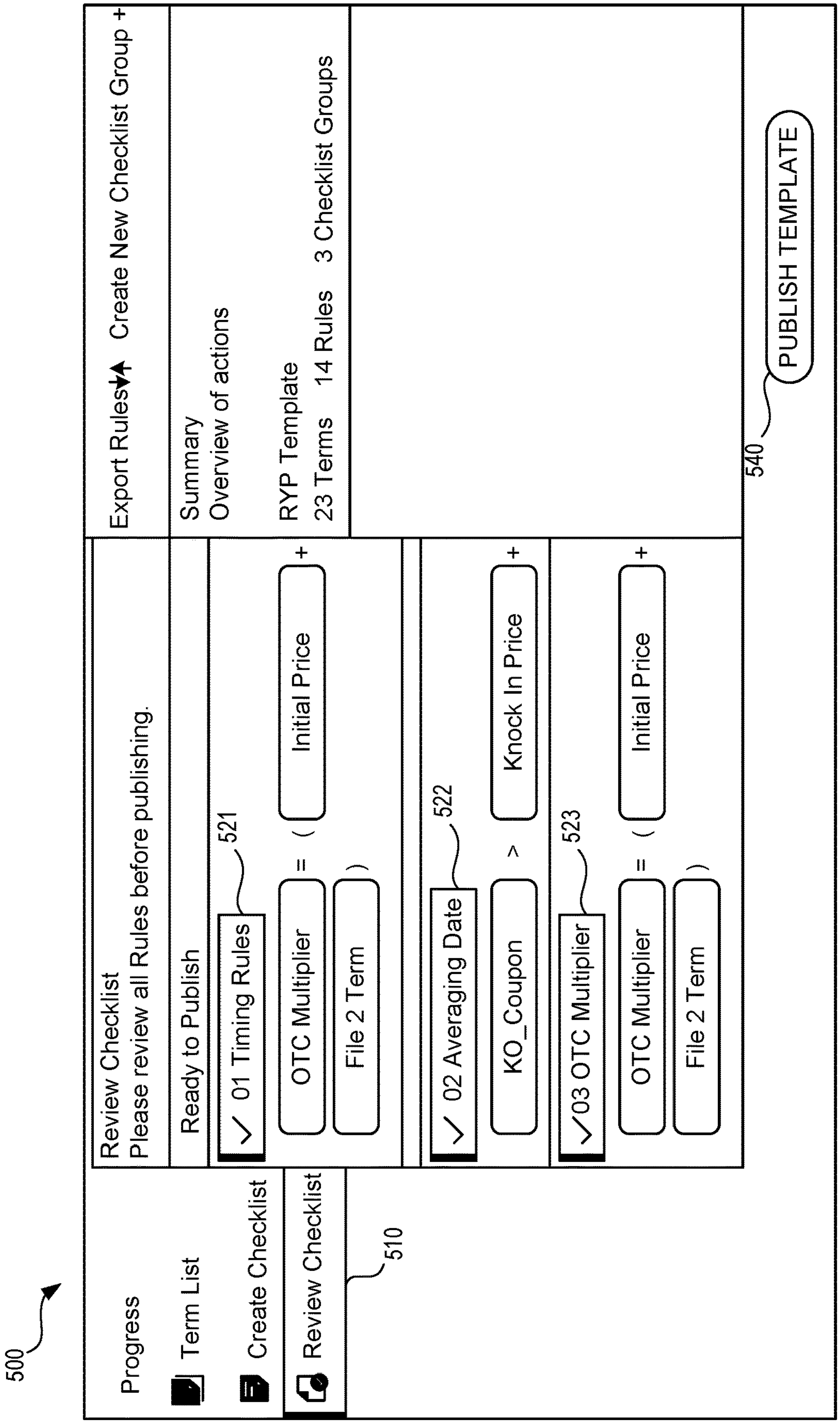
FIG. 5A illustrates a graphical user interface for reviewing rules associated with various terms in a checklist before publishing, according to one embodiment.

FIG. 5A illustrates a graphical user interface 500 for reviewing rules associated with various terms in a checklist prior to publishing the template, at 540, according to one embodiment. As illustrated, the review checklist interface 510 displays rules associated with salient terms that are ready for publishing. A summary of analysis rules forming the analysis ruleset and potential problems may be displayed. In the illustrated example, the analysis ruleset includes timing rules 521, an averaging date rule 522, and an OTC multiplier rule 523. Upon user confirmation that the terms and associated rules are ready for publishing, the user may select the "Publish Template" button 540.

Figure 5B:
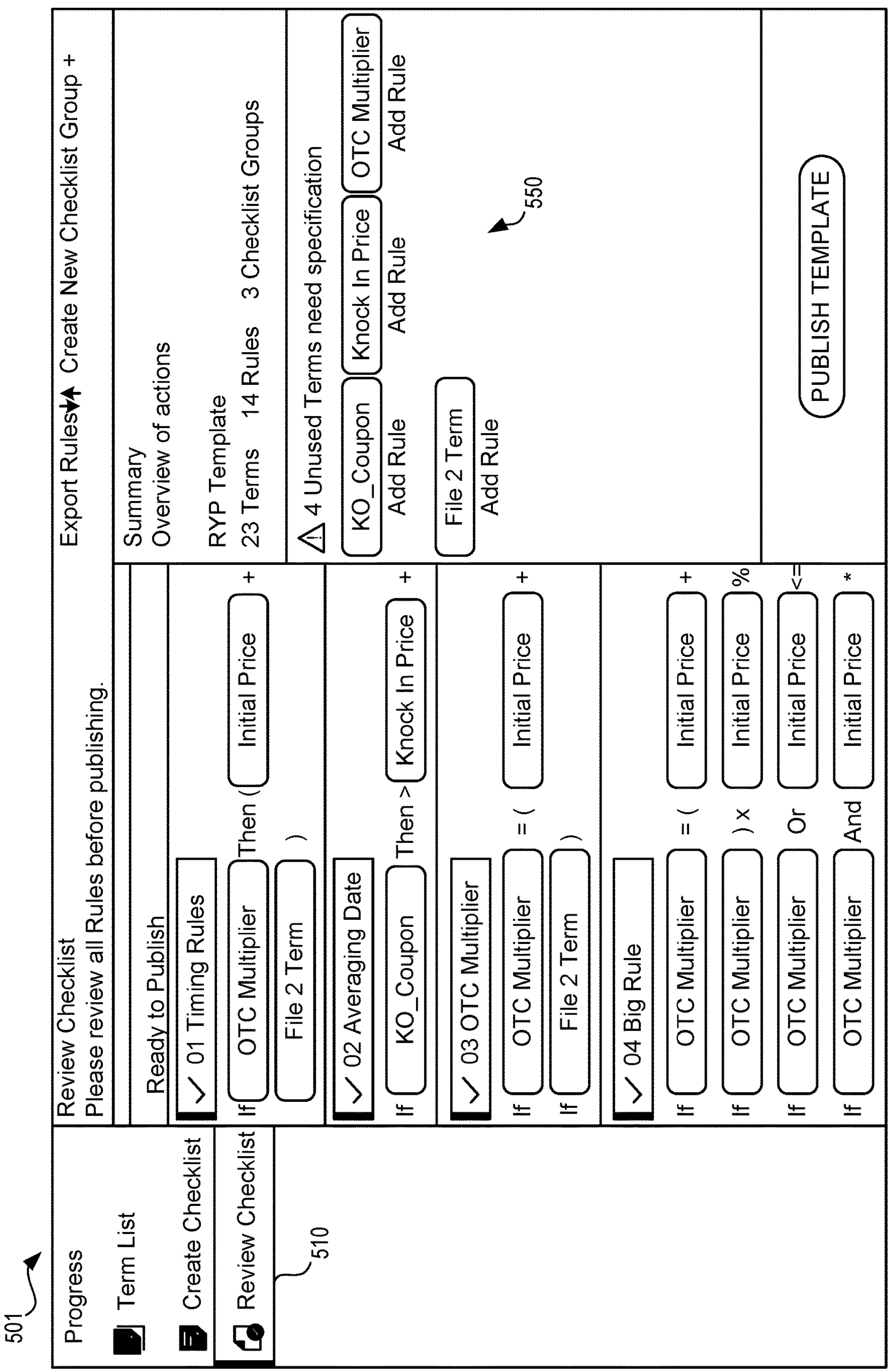
FIG. 5B illustrates another portion of a graphical user interface for reviewing the rules associated with the various terms in the checklist, according to one embodiment.

FIG. 5B illustrates another portion of a graphical user interface 501 for reviewing, at 510, the rules associated with the various terms in the checklist, according to one embodiment. Potential issues are identified, at 550, including the failure to use some terms in the specification. The user may confirm that these terms are unneeded or modify or add rules to the unused terms.

Figure 6:
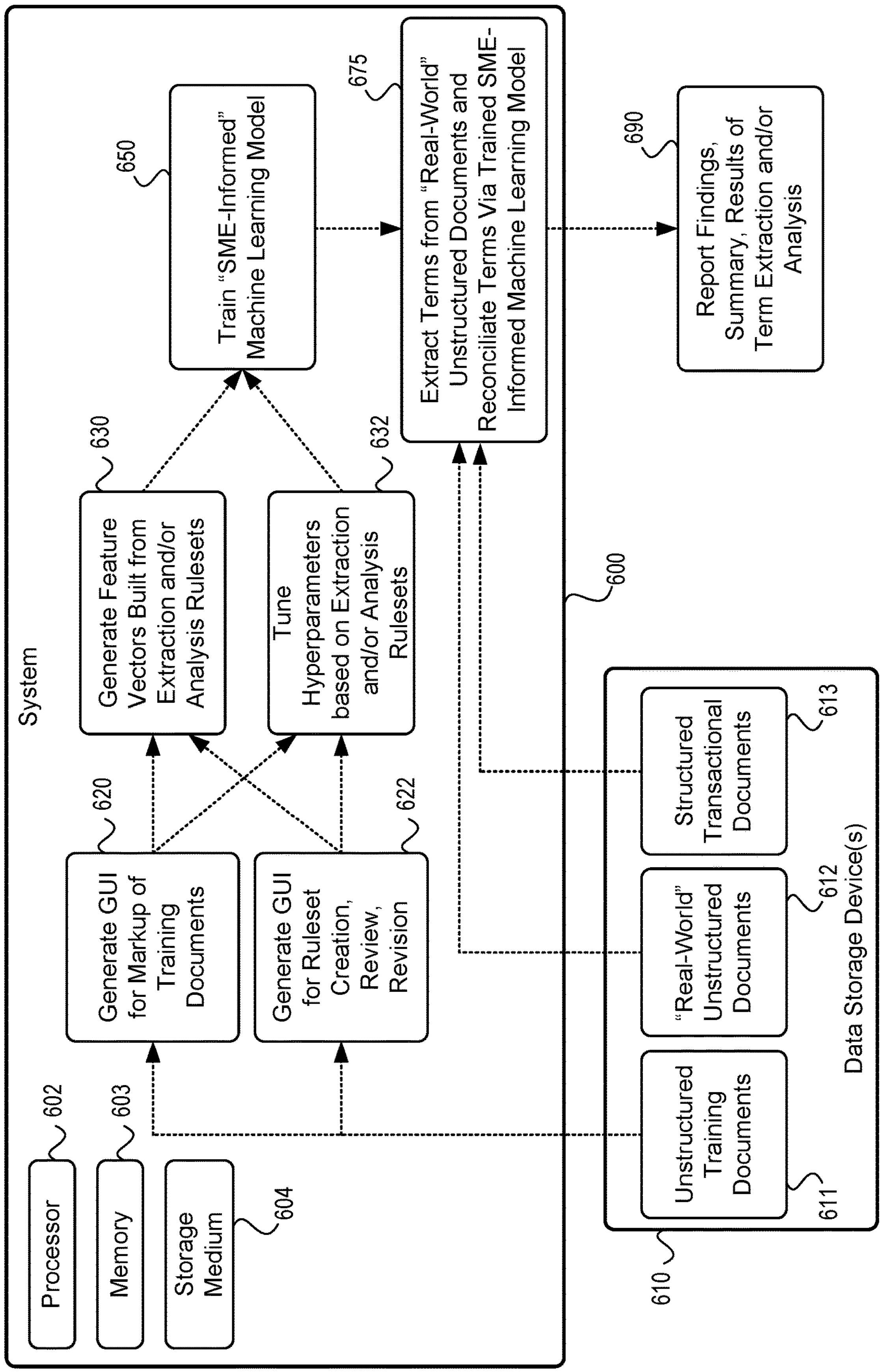
FIG. 6 illustrates a block diagram of a system for training a subject matter expert-informed machine learning model for term extraction and analysis, according to one embodiment.

FIG. 6 illustrates a block diagram of a system 600 for training a subject matter expert-informed machine learning model for term extraction and analysis, according to one embodiment. As illustrated, the system 600 may include a processor 602, memory 603, and a storage medium 604, such as a non-transitory computer-readable medium. The non-transitory computer-readable storage medium may contain instructions stored thereon that, when executed by the processor 602, cause the system 600 to generate user interfaces, generate feature vectors, tune hyperparameters, train a machine learning model, import documents, extract terms, analyze terms, and/or report or display findings.

The system 600 may import unstructured training documents 611 from a data storage device 610. The system 600 may generate a graphical user interface 620 to display and receive markup of the unstructured training documents from a subject matter expert (or another use). The system 600 may also generate a graphical user interface 622 for ruleset creation, review, and/or revision. Accordingly, the system may provide a no-code approach for a subject matter expert to "inform" the system 600 with extraction rulesets for extracting terms from unstructured documents and analysis rulesets for analyzing terms after (or during) extraction.

The system 600 may generate feature vectors, at 630, that are built from, dependent upon, or modified in view of or based on the user-provided extraction ruleset and/or analysis ruleset. The system 600 may generate tune hyperparameters, at 632 based on the user-provided extraction ruleset and/or analysis ruleset. The system 600 may train, at 650, a subject matter expert-informed machine learning model (an SME-Informed ML model) using the unstructured training documents 611 in combination with the feature vectors build from the ruleset(s) and/or the hyperparameters tuned by the ruleset(s).

The system 600 may import "real-world" unstructured documents 612 and extract the salient terms using the trained SME-Informed ML model, at 675. The system 600 may also import structured transactional documents 613 from the data storage device(s) 610 to analyze (e.g., reconcile), at 675, the terms extracted from the unstructured training documents 611 with transactional values imported from the structured transactional documents 613. In some embodiments, a first SME-Informed ML model may be used for term extraction and a second SME-Informed ML model may be used for the analysis of the extracted terms. The system 600 may generate a report, at 690, of the findings, results, summaries, and/or other relevant and customizable information. The report may be generated as a PDF, a table, a spreadsheet, CSV values, and/or as an interactive graphical user interface that facilitates review and validation of term extraction and analysis by the system 600.

Figure 7:
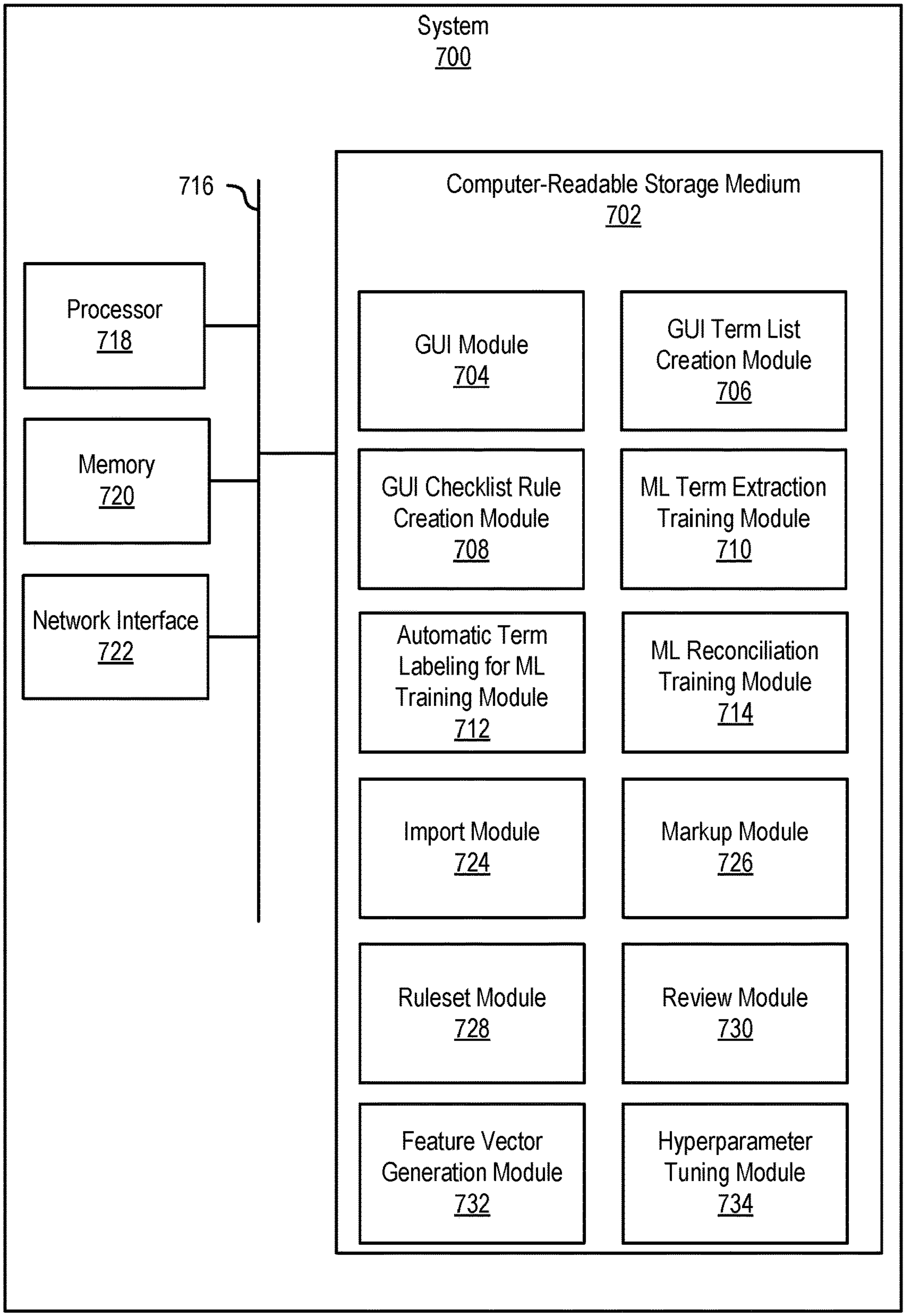
FIG. 7 illustrates an example of a computer system for implementing the various processes and methods described herein, according to various embodiments.

FIG. 7 illustrates an example of a computer system 700 for implementing the various processes and methods described herein, according to various embodiments. As illustrated, the system 700 may include a bus 716 that connects a processor 718, a memory 720, and a network interface 722 to a computer-readable storage medium 702, such as a non-transitory computer-readable storage medium 702. The computer-readable storage medium 702 may include a GUI module 704 to generate any of the graphical user interfaces described herein. A GUI term list creation module 706 facilitates the creation of term lists or templates for terms extracted or identified as salient within structured and/or unstructured documents.

A GUI checklist rule creation module 708 facilitates the creation of checklists of rules associated with the various terms. An ML term extraction training module 710 facilitates the training of one or more machine learning modules for extracting terms from unstructured and/or structured documents. As described herein, the machine learning models may be trained based on feature vectors and/or hyperparameters that are informed by the rulesets generated in response to the subject matter expert inputs.

An automatic term labeling module 712 for the ML training module 710 may facilitate automatic labeling of training or sample documents that are used to train machine learning modules. The system 700 may also include an ML reconciliation training module 714 to facilitate training machine learning models to improve reconciliation of terms extracted from structured and unstructured documents. An import module 724 may facilitate the importation of electronic training documents from a digital data storage device. A markup module 726 may present the graphical user interfaces to a user to receive markups of the electronic training documents to identify salient terms. A ruleset module 728 may generate an estimated extraction ruleset that can be reviewed and modified by the user via the ruleset review module 730. A feature vector generation module 732 may generate feature vectors for the salient terms built from the extraction and/or analysis rulesets. A hyperparameter tuning module 734 may facilitate the adjustment or modification of hyperparameters (e.g., adjusted weights and biases) based on the extraction and/or analysis rulesets.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations. Thus, all feasible permutations and combinations of embodiments are contemplated.

Several aspects of the embodiments described may be implemented using hardware, firmware, and/or software modules or components. As used herein, a module or component may include various hardware components, firmware code, and/or any type of computer instruction or computer-executable code located within a memory device and/or transmitted as transitory or non-transitory electronic signals over a system bus or wired or wireless network. Many of the embodiments described herein are shown in block diagram form and/or using logic symbols. It is appreciated that various elements of each of the illustrated and described embodiments could be implemented using FPGAs, custom application-specific integrated circuits (ASICs), and/or as hardware/software combinations.

In the description above, various features are sometimes grouped in a single embodiment, figure, or description thereof to streamline this disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims are hereby expressly incorporated into this Detailed Description, with each claim standing on its own as a separate embodiment. This disclosure also includes all permutations and combinations of the independent claims with their dependent claims.

What is claimed is:

1. A computer-implemented system for generating and executing a machine-readable checklist template from an unstructured electronic document comprising one or more images, the system comprising:

an import module to import an unstructured electronic document comprising one or more images and a source document from a digital data storage device;

a GUI module to present a graphical user interface displaying at least a portion of the unstructured electronic document to a user;

a markup module to receive, via the graphical user interface, a markup of a portion of the unstructured electronic document corresponding to a salient term;

a GUI term list creation module to generate a term list entry for the salient term, the term list entry comprising:

a term name for the salient term;

a data object type associated with the salient term; and an association between the salient term and the markup of the portion of the unstructured electronic document;

a ruleset module to generate an extraction ruleset associated with the term list entry, wherein the extraction ruleset includes a contextual extraction rule that identifies, for the salient term, at least one of:

a relative location of the markup within the unstructured electronic document, a relative location of the salient term within the unstructured electronic document, identifiable text expected to be proximate to the salient term, an identifiable image expected to be proximate to the salient term, a formatting style of the salient term, and an expected formatting variance of the salient term;

wherein the contextual extraction rule is stored in the machine-readable checklist template for use in extracting, from a subsequently imported unstructured electronic document an extracted term corresponding to the salient term;

a GUI checklist rule creation module to receive, via the graphical user interface, an analysis ruleset associated with the term list entry, the analysis ruleset comprising:

a source term from the source document;

a comparison rule for comparing the extracted term with a source value corresponding to the source term; and a reconciliation rule for determining whether the extracted term and the source value match or differ;

wherein the GUI term list creation module and the GUI checklist rule creation module generate the machine-readable checklist template comprising the term list entry, the extraction ruleset, and the analysis ruleset, the analysis ruleset including the source term, the comparison rule, and the reconciliation rule;

a ruleset review module configured to:

present the term list entry, the extraction ruleset, the source term, the comparison rule, and the reconciliation rule to the user for review;

receive a user modification to at least one rule of the extraction ruleset or the analysis ruleset; and in response to user confirmation, publish the machine-readable checklist template; and a trained AI system configured to apply the published machine-readable checklist template to a subsequently imported unstructured electronic document comprising one or more images and a subsequently imported source document by:

extracting, from the subsequently imported unstructured electronic document and based on the contextual extraction rule, the extracted term;

extracting, from the subsequently imported source document and based on the source term, the source value;

applying the comparison rule and the reconciliation rule to the extracted term and the source value to generate a reconciliation result; and generating an executed checklist comprising the extracted term, the source value, the reconciliation result, and an action to be taken based on whether the reconciliation result indicates a match or difference between the extracted term and the source value.

2. The system of claim 1, wherein the comparison rule is graphically defined by the user via the GUI checklist rule creation module using at least one comparison symbol selected from a greater than symbol, a less than symbol, and an equal symbol.

3. The system of claim 1, wherein the markup module is configured to receive the markup of the unstructured electronic document from the user via at least one of a touch screen input, a mouse input, and a keyboard input.

4. The system of claim 1, wherein the markup module is configured to receive the markup of the unstructured electronic document via natural language processing of a voice input provided by the user.

5. The system of claim 1, wherein the analysis ruleset further comprises a normalization rule for normalizing at least one of the extracted term and the source value before application of the comparison rule.

6. The system of claim 1, wherein the extraction ruleset includes a semantic match rule configured to identify, for the salient term, a set of semantically equivalent terms used by the trained AI system to extract the extracted term from the subsequently imported unstructured electronic document.

7. The system of claim 1, wherein the GUI checklist rule creation module is configured to receive user input defining the analysis ruleset associated with the term list entry.

8. The system of claim 1, wherein the reconciliation rule is configured to determine whether the extracted term and the source value match or differ using at least one of an exact match, an explicit match, and a semantic match.

9. The system of claim 1, wherein the reconciliation rule uses an acceptable deviation value to determine whether the extracted term and the source value match or differ.

10. The system of claim 1, wherein the executed checklist is generated as or included in at least one of a PDF report, an interactive graphical user interface, a table, a spreadsheet, and CSV values.

11. The system of claim 1, wherein the GUI module is configured to present a template manager interface configured to upload files, create new checklists, create new templates, modify existing templates, or modify existing workflows.

12. The system of claim 1, wherein the unstructured electronic document comprises at least one of a PDF document and an image comprising extracted terms.

13. A computer-implemented method for generating and executing a machine-readable checklist template from an unstructured electronic document comprising one or more images, the method comprising:

importing an unstructured electronic document comprising one or more images and a source document from a digital data storage device;

presenting a graphical user interface displaying at least a portion of the unstructured electronic document to a user;

receiving, via the graphical user interface, a markup of a portion of the unstructured electronic document corresponding to a salient term;

generating a term list entry for the salient term, the term list entry comprising:

a term name for the salient term;

a data object type associated with the salient term; and an association between the salient term and the markup of the portion of the unstructured electronic document;

generating, for the term list entry, an extraction ruleset comprising a contextual extraction rule that identifies at least one contextual extraction condition for the salient term, the at least one contextual extraction condition comprising at least one of:

a relative location of the markup within the unstructured electronic document;

a relative location of the salient term within the unstructured electronic document;

identifiable text expected to be proximate to the salient term;

an identifiable image expected to be proximate to the salient term;

a formatting style of the salient term; and an expected formatting variance of the salient term;

receiving, via the graphical user interface, an analysis ruleset associated with the term list entry, the analysis ruleset comprising:

a source term from the source document;

a comparison rule for comparing an extracted term corresponding to the salient term with a source value corresponding to the source term; and a reconciliation rule for determining whether the extracted term and the source value match or differ;

generating the machine-readable checklist template to include the term list entry, the extraction ruleset, and the analysis ruleset, the analysis ruleset including the source term, the comparison rule, and the reconciliation rule;

publishing the machine-readable checklist template after user review of the term list entry, the extraction ruleset, the source term, the comparison rule, and the reconciliation rule;

executing the published machine-readable checklist template against a subsequently imported unstructured electronic document comprising one or more images and a subsequently imported source document by:

extracting, from the subsequently imported unstructured electronic document and according to the contextual extraction rule, the extracted term;

extracting, from the subsequently imported source document and according to the source term, the source value;

applying the comparison rule and the reconciliation rule to the extracted term and the source value to generate a reconciliation result; and generating an executed checklist comprising the extracted term, the source value, the reconciliation result, and an action to be taken based on whether the reconciliation result indicates a match or difference between the extracted term and the source value.

* * * * *